(12) United States Patent
Larose et al.

(10) Patent No.: US 11,308,748 B2
(45) Date of Patent: Apr. 19, 2022

(54) FLEXIBLE IDENTIFICATION BAND WITH CUT DETECTION

(71) Applicant: Endur ID, Inc., Hampton, NH (US)

(72) Inventors: Albert Larose, Dracut, MA (US); Robert Chadwick, Hampton Falls, NH (US)

(73) Assignee: Endur ID, Inc., Hampton, NH (US)

( * ) Notice: Subject to any disclaimer, the term of this patent is extended or adjusted under 35 U.S.C. 154(b) by 0 days.

(21) Appl. No.: 16/867,673

(22) Filed: May 6, 2020

(65) Prior Publication Data

US 2020/0364962 A1   Nov. 19, 2020

Related U.S. Application Data

(60) Provisional application No. 62/848,131, filed on May 15, 2019.

(51) Int. Cl.
| | |
|---|---|
| *G07C 9/28* | (2020.01) |
| *G08B 13/14* | (2006.01) |
| *H04W 4/80* | (2018.01) |
| *G08B 25/00* | (2006.01) |

(52) U.S. Cl.
CPC ........... *G07C 9/28* (2020.01); *G08B 13/1454* (2013.01); *G08B 25/009* (2013.01); *H04W 4/80* (2018.02)

(58) Field of Classification Search
CPC .... G07C 9/28; G08B 13/1454; G08B 25/009; H04W 4/80
See application file for complete search history.

(56) References Cited

U.S. PATENT DOCUMENTS

| | | | |
|---|---|---|---|
| 2,586,758 | A | 2/1952 | Zerr |
| 3,935,977 | A | 2/1976 | Bonnett |
| 4,049,357 | A | 9/1977 | Hamisch, Jr. |
| 4,416,038 | A | 11/1983 | Morrone, III |
| 4,635,698 | A | 1/1987 | Anderson |
| 5,208,950 | A | 5/1993 | Merritt |
| 5,381,617 | A | 1/1995 | Schwartztol et al. |
| 5,473,797 | A | 12/1995 | Wu |
| 5,495,644 | A | 3/1996 | Mesher et al. |
| 5,548,878 | A | 8/1996 | Romagnoli |
| 5,577,395 | A | 11/1996 | Kuykendall |

(Continued)

OTHER PUBLICATIONS

Minew Technologies. Beacon/iBeacon/MiniBeacon Datasheet V1.0 technical specification sheet.

*Primary Examiner* — James J Yang
(74) *Attorney, Agent, or Firm* — Onello & Mello, LLP

(57) ABSTRACT

Provided is a band cut detection system, comprising a flexible band having a transmission medium extending along its length, a processor coupled to the transmission medium, and a wireless communication device coupled to the processor, wherein the processor and wireless communication device are configured to generate and transmit a cut detection signal when the flexible band is cut, damaged, or otherwise compromised. A clasp can be included and configured to irremovably secure overlapping portions of the flexible band. The clasp can encase and protect the processor. The band cut detection system can comprise a detection application executable by a processor of a computer to receive and process the cut detection signal and responsively generate a cut detection indication.

20 Claims, 33 Drawing Sheets

(56) References Cited

U.S. PATENT DOCUMENTS

| | | |
|---|---|---|
| 5,671,508 A | 9/1997 | Murai |
| 5,689,860 A | 11/1997 | Matoba et al. |
| 5,959,533 A * | 9/1999 | Layson, Jr. ............... G07C 9/28 340/8.1 |
| 6,453,519 B1 | 9/2002 | Gelardi |
| 6,510,592 B1 | 1/2003 | Hamilton |
| 6,565,049 B2 | 5/2003 | Hahn |
| 6,571,434 B2 | 6/2003 | Ortiz |
| 6,618,910 B1 | 9/2003 | Pontaoe |
| 6,826,806 B2 | 12/2004 | Eaton et al. |
| 7,204,425 B2 | 4/2007 | Mosher, Jr. et al. |
| 7,237,307 B2 | 7/2007 | Feschuk |
| 7,316,358 B2 | 1/2008 | Kotik et al. |
| 7,323,998 B2 | 1/2008 | Girvin et al. |
| 7,367,092 B1 | 5/2008 | Dilday |
| 7,406,789 B2 | 8/2008 | Story |
| 7,417,541 B2 | 8/2008 | Lerch et al. |
| 7,518,500 B2 | 4/2009 | Aninye et al. |
| 7,614,179 B2 | 11/2009 | Kavanaugh |
| 8,485,448 B2 | 7/2013 | Maizlin et al. |
| 8,686,861 B2 | 4/2014 | Chung et al. |
| 9,064,391 B2 | 6/2015 | Vardi et al. |
| 9,218,454 B2 | 12/2015 | Kiani et al. |
| 9,339,408 B2 | 5/2016 | Chadwick |
| 9,555,943 B2 | 1/2017 | Breen, IV et al. |
| 9,622,546 B2 | 4/2017 | Turdjian |
| 9,730,495 B2 | 8/2017 | Howell |
| 9,875,628 B2 | 1/2018 | Pokrajac et al. |
| 10,188,176 B2 | 1/2019 | Chadwick |
| 10,441,037 B2 | 10/2019 | Chadwick |
| 2002/0088095 A1 | 7/2002 | Hahn |
| 2003/0173408 A1 | 9/2003 | Mosher, Jr. et al. |
| 2003/0217441 A1 | 11/2003 | Eaton et al. |
| 2004/0104274 A1 | 6/2004 | Kotik et al. |
| 2004/0257229 A1 | 12/2004 | Girvin et al. |
| 2005/0091801 A1 | 5/2005 | Feschuk |
| 2005/0166436 A1 | 8/2005 | Girvin et al. |
| 2006/0042151 A1 | 3/2006 | Kavanaugh |
| 2006/0087437 A1 | 4/2006 | Lerch et al. |
| 2006/0196016 A1 | 9/2006 | Cai et al. |
| 2008/0088437 A1 | 4/2008 | Aninye et al. |
| 2009/0255101 A1 | 10/2009 | Lin |
| 2010/0164710 A1 | 7/2010 | Chung et al. |
| 2011/0001605 A1 | 1/2011 | Kiani et al. |
| 2011/0248853 A1* | 10/2011 | Roper ............... G08B 21/0288 340/573.4 |
| 2012/0132717 A1 | 5/2012 | Maizlin et al. |
| 2013/0091668 A1 | 4/2013 | Turdjian |
| 2013/0097824 A1 | 4/2013 | Chadwick |
| 2013/0182382 A1* | 7/2013 | Vardi ............... G08B 21/0211 361/679.01 |
| 2015/0077257 A1 | 3/2015 | Pokrajac et al. |
| 2015/0128384 A1 | 5/2015 | Breen, IV et al. |
| 2016/0088905 A1 | 3/2016 | Perry |
| 2016/0106370 A1* | 4/2016 | Filipovic ............ H04M 1/0254 340/870.07 |
| 2016/0157564 A1 | 6/2016 | Howell |
| 2016/0219987 A1 | 8/2016 | Chadwick |
| 2017/0224063 A1 | 8/2017 | Chadwick |
| 2019/0087705 A1* | 3/2019 | Bourque .......... G06K 19/07762 |
| 2020/0146401 A1 | 5/2020 | Larose et al. |

* cited by examiner

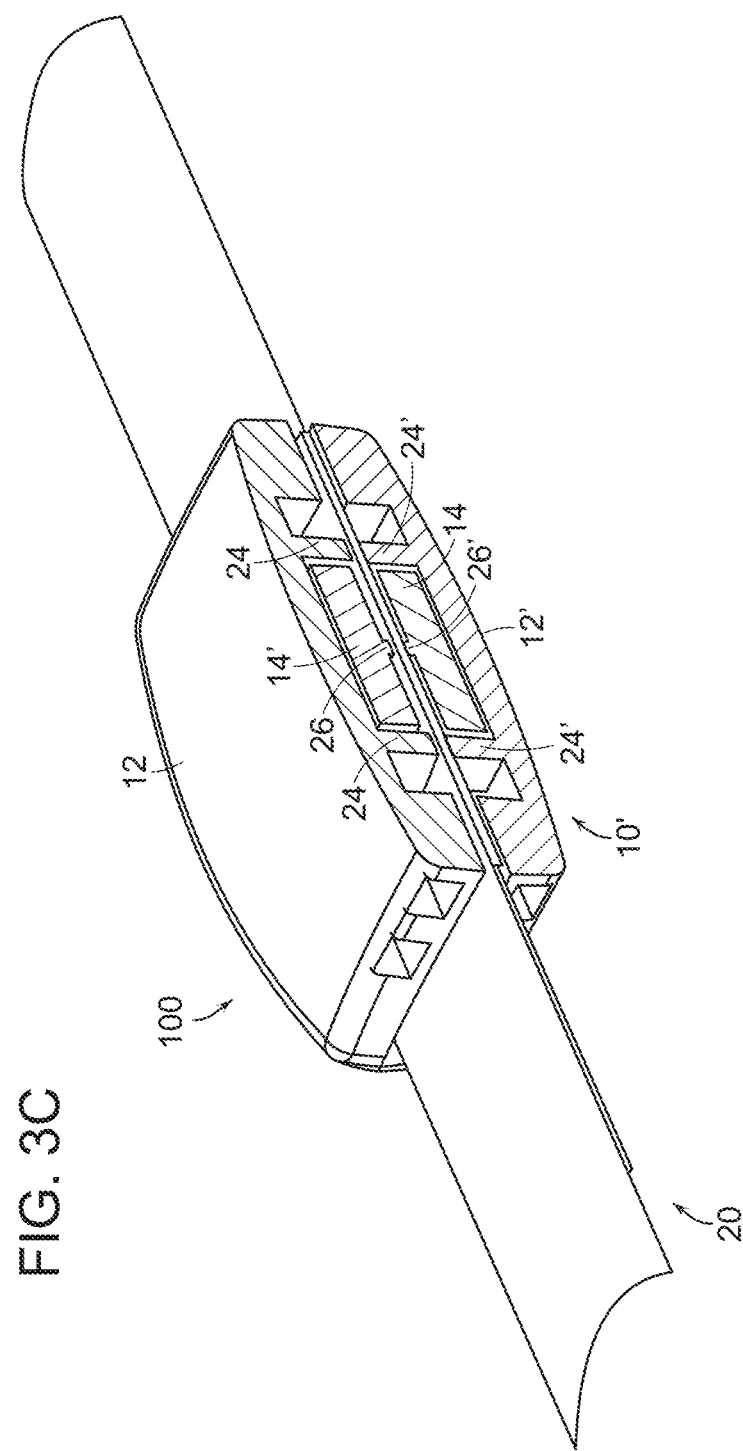

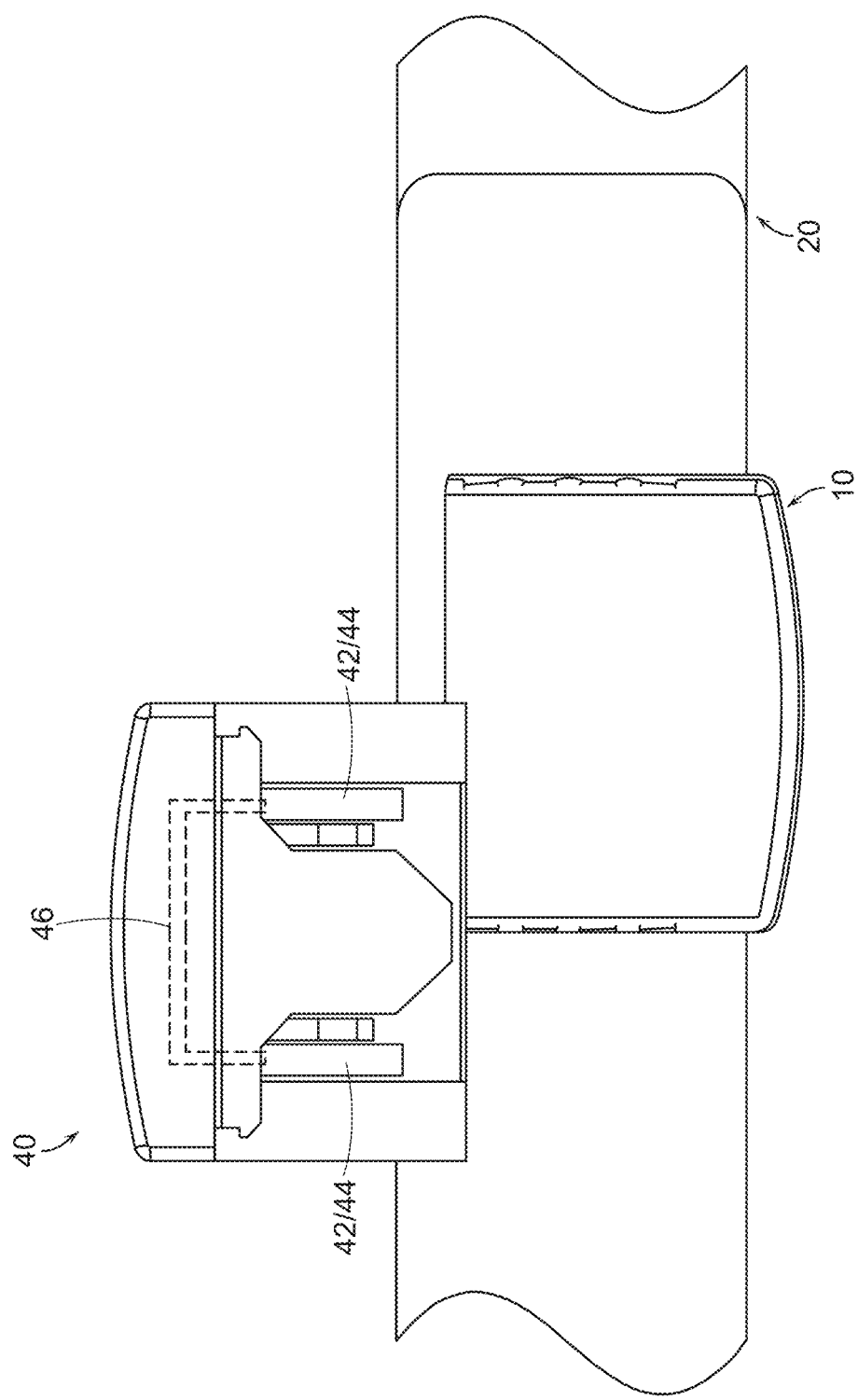

FLEXIBLE IDENTIFICATION BAND WITH CUT DETECTION

RELATED APPLICATIONS

This application claims the benefit of U.S. Provisional Application No. 62/848,131, filed May 15, 2019, the content of which is incorporated herein by reference in its entirety.

The present application, while not claiming priority to, may be related to U.S. Pat. No. 8,091,261, entitled "Bands For Making Adjustable Loops", issued Jan. 10, 2012, which is a 35 USC 371 national stage filing of Patent Cooperation Treaty Application No. PCT/US2007/088333, entitled "Bands For Making Adjustable Loops", filed Dec. 20, 2007, published as WO2008/079952, which claims priority to U.S. Patent Provisional Application No. 60/870,947, entitled "Wristband Design And Attachment Method", filed Dec. 20, 2006, each of which is incorporated herein by reference.

The present application, while not claiming priority to, may be related to U.S. Pat. No. 8,117,777, entitled "Multi-Layer Wristband With Removable Labels Incorporated Into The Wristband", issued Feb. 22, 2012, which is a continuation-in-part of U.S. patent application Ser. No. 10/857,214, entitled "Identification Bracelet", filed May 28, 2004, which claims priority to U.S. Patent Provisional Application No. 60/474,189, entitled "Personal Identification System", filed May 29, 2003, each of which is incorporated herein by reference.

The present application, while not claiming priority to, may be related to U.S. Pat. No. 10,441,037, entitled "Clasp For Securing Flexible Bands", issued Oct. 15, 2019, which is a continuation-in-part of U.S. Pat. No. 10,188,176, issued Jan. 29, 2019, which is a continuation of U.S. Pat. No. 9,339,408, issued May 17, 2016, which claims priority to U.S. Patent Provisional Application No. 61/550,152, filed Oct. 21, 2011, each of which is incorporated herein by reference.

The present application, while not claiming priority to, may be related to U.S. patent application Ser. No. 16/678,690, entitled "Clasp With Bluetooth For Securing A Flexible Band", filed Nov. 8, 2019, which claims priority to U.S. Patent Provisional Application No. 62/757,778, filed Nov. 9, 2018, and U.S. Patent Provisional Application No. 62/841,405, filed May 1, 2019, each of which is incorporated herein by reference.

FIELD

Embodiments of inventive concept relate to flexible identification bands, such as secure identification bands, and their methods of use and manufacture.

BACKGROUND

Flexible bands including, for example, wrist straps or bands and bundled fiber/cable ribbons, can be exposed to external factors which can compromise their connecting ends. For example, an identifying wrist band on an individual, e.g., a patient, an inmate, or a parolee, is generally attached at or near its ends with an adhesive portion or unsecure interlocking feature, and the removal of the band at the resulting seam can be caused by accidental or intentional manipulation or dismantling by the patient, inmate, parolee, monitored individual, or others.

In various settings and circumstances, it is intended that flexible identification bands are secured to an individual's wrist or ankle so that they are irremovable without tampering. For some bands, one kind of tampering that enables removal is to cut the band, e.g., with scissors, a knife, or other sharp object. Other types of tampering could include breaking a clasp that secures the band. Tamperproof bands are difficult, if not impossible, to achieve, particularly without making the bands cost-prohibitive for a great many of the applications that use secure identification bands. It would, therefore, be advantageous for those monitoring an individual wearing an identification band to know if the band were removed or otherwise compromised. It would be further advantageous for the band (and/or securing clasp) to include technology to automatically and in real or near-real time generate a cut detection or band removal alert.

SUMMARY

As used herein, the terms "band," "flexible band," and "flexible strip" may refer to any of the various flexible materials or substrates disclosed herein, or other flexible materials not specifically mentioned herein, used or useful for forming an identification band. In various forms, the flexible band is a printable band or one of a plurality of bands in a sheet of printable bands. A secure band is a flexible band that is intended to be irremovable by the individual wearing the band, e.g., on a wrist or ankle.

A clasp can be provided for enclosing and protecting at least a portion of a flexible band and, in an example embodiment, for securing and/or encasing the connecting or overlapping portions of one or more bands. A "clasp," as used herein, comprises a rigid body having one or more parts that encase a portion of the band. Some example embodiments provide a clasp having mechanically interlocking members that, when interlocked together, encase and surround a portion of a band, e.g., the connected ends (or a seam) or overlapped portions of a band. The clasp may be configured to prevent slippage of the band within the clasp and protect an enclosed seam or overlapped portion, for example, from being disconnected by external factors, such as manipulation by a wearer of the band.

In some embodiments, the clasp may comprise two identical interlocking members. In some embodiments, the interlocking members need not be identical. In embodiments where the interlocking members are not identical, interlocking portions of the interlocking members may still be identical or substantially similar.

In accordance with aspects of the inventive concepts, provided is a secure band apparatus, comprising a flexible band having a transmission medium extending along at least a portion of its length, a processor (or microprocessor) coupled to the transmission medium, a wireless communication device coupled to the processor, and a memory comprising detection logic executable by the processor to transmit a cut detection signal via the wireless communication device in response to a lack, corruption, or interruption of continuity in the transmission medium.

In some embodiments, the inlay antenna extends at least 90 percent of the length of the flexible band In various embodiments, the system can further include a clasp configured to irremovably secure and/or encase overlapping portions of the flexible band.

In various embodiments, the processor, communication device, and/or the memory can be integral with, encased by, or form a portion of the clasp.

In accordance with aspects of the inventive concepts, an identification band cut detection system can comprise the secure identification band apparatus and a cut detection application executable by a processor of at least one computer to wirelessly communicate with one or more flexible bands to receive the cut detection signals and responsively generate cut detection indications.

In some embodiments, the cut detection application can be executable on a mobile device (e.g., a mobile phone or other handheld device). In some embodiments, the mobile device executing the cut detection application can generate cut detection alerts in response to a cut detection signal. In some embodiments, the mobile device executing the cut detection application can wirelessly communicate the cut detection signal and/or alerts to other systems, e.g., one or more other mobile devices and/or a security system or other monitoring system.

According to one aspect of the inventive concepts, a clasp is configured to interlock around and encase a portion of a flexible band. The clasp can be formed to enable the band to enter and exit the clasp through different sides of the clasp. In one example embodiment, the clasp includes first and second interlocking members, each interlocking member including two hooks and two recesses, each of the hooks of the first member arranged to engage and interlock with one of the recesses of the second member and each of the hooks of the second member arranged to interlock with one of the recesses of the first member, so as to prevent movement between the interlocking members when interlocked. When interlocked, the clasp may also prevent movement or slippage of the flexible band of material within the clasp.

In some example embodiments, the interlocking members are arranged so that, once engaged and interlocked, the clasp is permanently closed and locked.

In example embodiments, each interlocking member includes an outer shell having interlocking recesses formed therein, a tongue having interlocking hooks, and a tongue receiving slot formed between the tongue and the outer shell, wherein, when the first and second interlocking members are interlocked, the tongue of one interlocking member fits within the tongue receiving slot of the other interlocking member and the hooks of one interlocking member engage the interlocking recesses of the other interlocking member, thereby preventing disengagement of the interlocking members.

In some example embodiments, each interlocking hook comprises an angled member configured to facilitate insertion into a corresponding interlocking recess and a stop member configured to prohibit removal of the interlocking hook from the corresponding interlocking recess.

In some example embodiments, the first and second interlocking members are identical pieces. In some example embodiments, the first and second interlocking members have interlocking portions that are identical or substantially the same. In other embodiments, the first and second interlocking members are different, but have corresponding interlocking portions that securely mate together.

In some example embodiments, the outer shell includes an inner surface forming a portion of the tongue receiving slot, wherein internal ribs protrude from the inner surface of the shell and form opposing sides of the tongue receiving slot.

In some example embodiments, the tongues are arranged so that when the first and second interlocking members are interlocked, they define a path configured to compress and secure the flexible band to substantially prevent movement within the clasp.

In some example embodiments, the tongues further include protrusions extending from a tongue inner surface forming a portion of the tongue receiving slot; the protrusions are configured to substantially prevent sliding of the flexible band between the interlocking members when interlocked.

In some example embodiments, each interlocking member further includes a base from which the outer shell and tongue extend substantially in parallel.

In some example embodiments, the tongue of each interlocking member is configured to slidably engage the tongue receiving slot of the other interlocking member.

In some example embodiments, when the first and second interlocking members are interlocked, a portion of the flexible band of material is disposed between and in parallel with the tongues and outer shells of the first and second interlocking members.

In some example embodiments, the clasp is arranged to enclose and prevent access to a seam of the flexible band. In some embodiments, the flexible band is a flexible wrist or ankle strap or band.

In some example embodiments, the flexible band comprises at least one of plastic, polyester, or polypropylene. The flexible bands can be latex-free and printable, e.g., with a laser printer. The flexible bands can come individually in or printable sheets.

In some example embodiments, the clasp is constructed substantially of plastic, resin, and/or metal.

In some example embodiments, at least one of the first and second interlocking members comprises a radio frequency identification (RFID) chip.

In some example embodiments, at least one of the first and second interlocking members comprises a Bluetooth communication device.

According to another aspect of the inventive concept, provided is an interlocking member forming a portion of a clasp configured to secure a band. The interlocking member comprises a shell including a base and a Bluetooth communication device secured to or integral with the shell. The interlocking member is configured to interlock with a second interlocking member to form a clasp configured to permanently secure a flexible band passing through the clasp from one side to an opposite side, wherein a portion of the flexible band is compressed.

In some example embodiments, the Bluetooth communication device is maintained by a holder that is secured to or integral with the shell.

In some example embodiments, the interlocking member further comprises a radio frequency identification (RFID) chip.

According to another aspect of the inventive concept, provided is a clasp configured to permanently secure a flexible band, comprising first and second interlocking members and a wireless communication device secured to or integral with at least one of the first and second interlocking members. When interlocked, the first and second interlocking members define a path from one side of the clasp to an opposite side of the clasp through which the flexible band passes such that the flexible band extends through a first opening in the one side of the clasp and a second opening in the opposite side of the clasp and the flexible band is compressed by and between the first and second interlocking members. The flexible band includes a Near Field Communication (NFC) antenna adhered or formed along a length of the flexible band.

In some example embodiments, the wireless communication device is a Bluetooth communication device that is maintained by a holder secured to or integral with at least one of the first and second interlocking members.

In some example embodiments, at least one of the first and second interlocking members comprises a radio frequency identification (RFID) chip.

According to another aspect of the inventive concept, provided is a clasp configured to permanently secure a flexible band, comprising first and second interlocking members. When interlocked, the first and second interlocking members define a path from one side of the clasp to an opposite side of the clasp through which the flexible band passes such that the flexible band extends through a first opening in the one side of the clasp and a second opening in the opposite side of the clasp and the flexible band is compressed by and between the first and second interlocking members. The flexible band is configured to include a Near Field Communication (NFC) antenna adhered along a length of the flexible band.

In some example embodiments, the clasp further includes a Bluetooth communication device secured to or integral with at least one of the first and second interlocking members.

In accordance with another aspect of the inventive concepts, provided is a secure identification band. The secure identification band comprises a flexible band having a transmission medium extending along its length, a processor coupled to the transmission medium, a wireless communication device coupled to the processor, a memory comprising detection logic executable by the processor to transmit a cut detection signal via the wireless communication device in response to a lack or interruption of continuity in the transmission medium, and a clasp configured to irremovably secure overlapping portions of the flexible band.

In some example embodiments, the transmission medium is a conductive medium.

In some example embodiments, the transmission medium is a fiber optic medium.

In some example embodiments, the transmission medium is an inlay antenna.

In some example embodiments, the processor, the inlay antenna, and the wireless communication device comprise a RFID (Radio Frequency Identification) device.

In some example embodiments, the processor, the inlay antenna, and the wireless communication device comprise a Near Field Communication (NFC) inlay antenna.

In some example embodiments, the inlay antenna extends along a length of the flexible band.

In some example embodiments, the inlay antenna is a wet inlay antenna.

In some example embodiments, the inlay antenna is a dry inlay antenna.

In some example embodiments, the inlay antenna is adhered to the flexible band.

In some example embodiments, the inlay antenna is integral with the flexible band.

In some example embodiments, the inlay antenna is disposed between layers of the flexible band.

In some example embodiments, the memory further comprises memory identification information identifying a wearer of the secure identification band and/or of the secure identification band.

In some example embodiments, the flexible band is a thin band formed of plastic, polyester, polyethylene film, bundled fiber/cable ribbons, and/or fibers.

In some example embodiments, the flexible band is a printable flexible band.

In some example embodiments, the printable flexible band is one of a plurality of printable flexible bands from a printable sheet of flexible bands.

In some example embodiments, the communication device comprises a Bluetooth communication device, which can be secured to or integral with the clasp.

In some example embodiments, the communication device comprises a RF communication device, which can be secured to or integral with the clasp.

In some example embodiments, the lack of continuity in the transmission medium is indicated by a cut in the transmission medium.

In some example embodiments, the lack of continuity in the transmission medium is indicated by an occlusion in the transmission medium.

In some example embodiments, the lack of continuity in the transmission medium is indicated by damage in the transmission medium.

In some example embodiments, the cut detection circuit comprises one-time protection (OTP) logic configured to authenticate and enable the cut detection circuit.

In accordance with another aspect of the inventive concepts, provided is an identification band cut detection system. The system comprises a flexible band having a cut detection circuit and a mobile device application executable by a processor of a mobile device to wirelessly communicate with one or more identification bands to receive the cut detection signal and responsively generate a cut detection indication.

In some example embodiments, the indication includes an alert at the mobile device.

In some example embodiments, the indication includes an alert transmission to another mobile device.

In some example embodiments, the indication includes an alert transmission to an external system.

In some example embodiments, the mobile device is a mobile phone or tablet.

In some example embodiments, the cut detection circuit comprises one-time protection (OTP) logic configured to authenticate and enable the cut detection circuit via the mobile device and/or cut detection app on the mobile device.

In accordance with another aspect of the inventive concepts, provided is a flexible band having cut detection, as shown and described.

In accordance with another aspect of the inventive concepts, provided is a flexible band having cut detection system, as shown and described.

In accordance with another aspect of the inventive concepts, provided is a flexible band having cut detection method, as shown and described.

BRIEF DESCRIPTION OF THE DRAWINGS

The foregoing and other features and advantages of embodiments of the present inventive concept will be apparent from the more particular description of embodiments of the inventive concept, as illustrated in the accompanying drawings in which like reference characters refer to the same elements throughout the different views. The drawings are not necessarily to scale, emphasis instead being placed upon illustrating the principles of the inventive concept in the drawings.

FIG. 3C is a cross-sectional perspective view of the clasp of FIG. 3B taken along line A-A', according to aspects of the inventive concepts.

FIG. 6A is an unassembled view of an embodiment of two interlocking members of a clasp incorporating an active RFID chip, according to aspects of the inventive concepts.

DETAILED DESCRIPTION

Figure 1A:
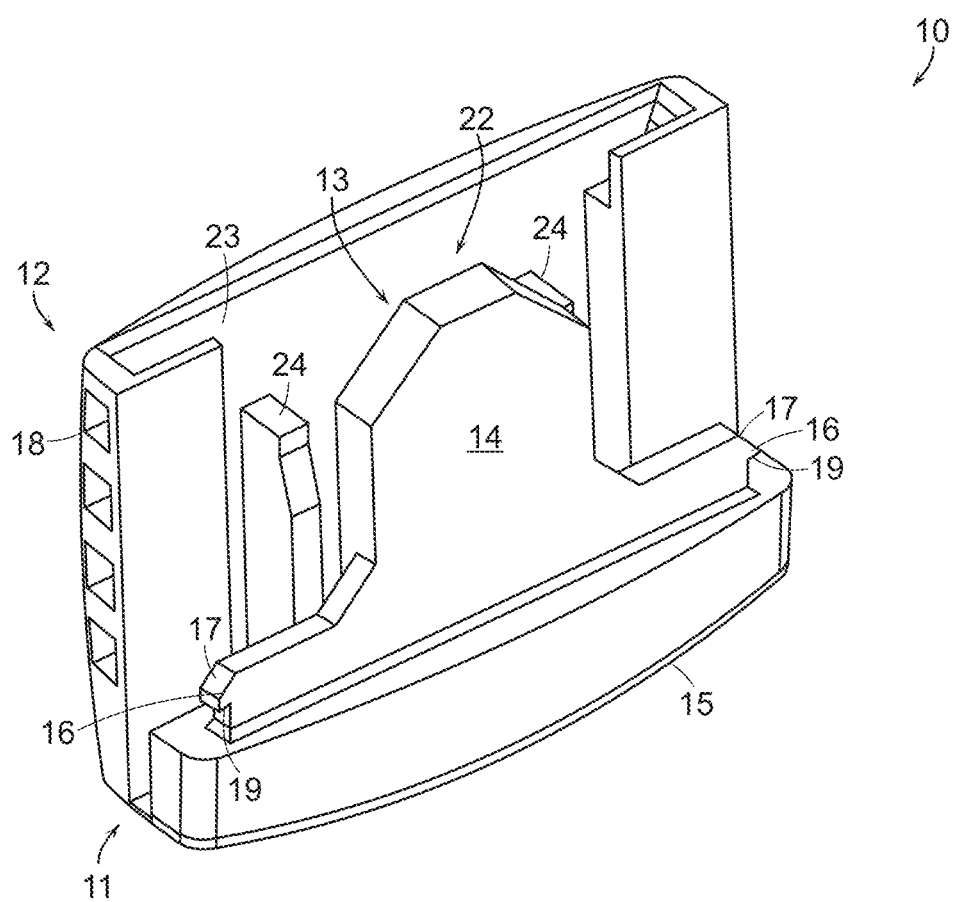
FIG. 1A is a perspective view of an embodiment of an interlocking member, according to aspects of the inventive concepts.

Various aspects of the inventive concepts will be described more fully hereinafter with reference to the accompanying drawings, in which some exemplary embodiments are shown. The drawings are not necessarily to scale, emphasis instead being placed upon illustrating the principles of the inventive concept in the drawings. The present inventive concepts may, however, be embodied in many different forms and should not be construed as limited to the exemplary embodiments set forth herein.

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

It will be understood that, although the terms first, second, third etc. may be used herein to describe various limitations, elements, components, regions, layers and/or sections, these limitations, elements, components, regions, layers and/or sections should not be limited by these terms. These terms are only used to distinguish one limitation, element, component, region, layer or section from another limitation, element, component, region, layer or section. Thus, a first limitation, element, component, region, layer or section discussed below could be termed a second limitation, element, component, region, layer or section without departing from the teachings of the present application.

It will be further understood that when an element is referred to as being "on" or "connected" or "coupled" to another element, it can be directly on or above, or connected or coupled to, the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.). When an element is referred to herein as being "over" another element, it can be over or under the other element, and either directly coupled to the other element, or intervening elements may be present, or the elements may be spaced apart by a void or gap.

Exemplary embodiments are described herein with reference to cross-sectional illustrations that are schematic illustrations of idealized exemplary embodiments (and intermediate structures). As such, variations from the shapes of the illustrations as a result, for example, of manufacturing techniques and/or tolerances, are to be expected. Thus, exemplary embodiments should not be construed as limited to the particular shapes of regions illustrated herein but are to include deviations in shapes that result, for example, from manufacturing.

To the extent that functional features, operations, and/or steps are described herein, or otherwise understood to be included within various embodiments of the inventive concept, such functional features, operations, and/or steps can be embodied in functional blocks, units, modules, operations and/or methods. And to the extent that such functional blocks, units, modules, operations and/or methods include computer program code, such computer program code can be stored in a computer readable medium, e.g., such as non-transitory memory and media, that is executable by at least one computer processor.

In accordance with various aspects of the inventive concept, provided is a clasp that may be used with any number of flexible bands, such as standard, plastic, polyester or polyethylene identification bands, as examples. The clasp may be used with various types of identification bands, straps, bracelets, anklets, or the like. The clasp may be used in various types of settings, medical facilities (for example, hospitals), nursing homes, paid entrance venues (for example, clubs, concerts, sporting events, museums), schools and universities, member only venues, house arrest or confinement settings, and secure locations, as examples. The clasp may add an additional layer of security for use in facilities where the subject may not cooperate, for example. Examples of such facilities can include: mental health facilities, lock-up facilities, detention centers, and prisons. In various embodiments, the secure identification band can be useful in settings that are not controlled, such as in the general public, e.g., for use with a parolee, registered sex offender, monitored individual, individuals having a certain status or condition, or others.

The clasp may be used, as an example, with straps or wrist bands or ankle bands that include Valéron® Strength Films, which is a flexible cross laminated high strength polyethylene film. The cross laminated high strength polyethylene film may be treated with polyester on both sides to protect the strap from heat. A coating on the cross laminated high strength polyethylene film may be water proof and scratch proof in order to protect the information stored on the strap.

In example embodiments, the clasp is easy to use, able to be put on a strap, wrist band, or ankle band without the use of tools. Preferably, the clasp is also very difficult or substantially impossible to open without tools or breakage, and is not able to be used as a weapon. It is also, preferably, comfortable and unobtrusive when worn.

The clasp described herein may be used to bind any two flat ribbon or band like materials without any destruction of the bound materials. For example, the clasp described herein may bind two ribbons containing fiber optics without destroying the integrity of the optics within.

Other possible applications of the example embodiments include providing clasps and bands for security seals for shipping, trucking, and/or railway containers. In one example embodiment, the clasps and bands may be used for labels for shipping containers or as a seal or tamper indicator for a door of such a container, such that the seal would need to be broken (or cut) to open the door.

In another example embodiment, the clasps may be used to attach ribbons to packages. In another example embodiment, the clasps may be used to create a belt or to cinch clothing.

In various embodiments, the clasp of the present invention includes two identical or substantially identical interlocking members that connect to secure and enclose a portion or portions of a band. In such cases, any two interlocking members can be used to form a clasp, such that the user need not be concerned with getting two different parts. For example, a package of 100 interlocking members would yield 50 clasps, no matter which two interlocking members were taken from the bag, in an exemplary embodiment.

In an example embodiment, the clasp uses four positive latching mechanisms, each of two interlocking members having two male and two female mechanisms configured to engage with the corresponding mechanisms of the other interlocking member. A positively locked and secure clasp may be provided with the application of some physical force that forces each male mechanism into the corresponding female mechanism as the two interlocking members are pressed together to form a clasp. That is, no tools are required to connect the two interlocking members. In addition, an example embodiment of the clasp is designed to be a single use device, so no provision is made to disengage it once locked. This provides security as it cannot be removed by any party. Therefore, in example embodiments, the two interlocking members are permanently locked together.

Embodiments of the clasp may be used with ID bands (for example, patient or inmate ID bands) to cover an adhesive flap overlapped and adhered onto the band to make the flap inaccessible to the wearer or others, or to cover any other overlapped portion of the band. In such a case, the clasp is positioned to cover the flap or overlap. As the two interlocking members are locked together, internal ribs engage the band and lock the clasp into that position so that the clasp cannot be slid sideways relative to the band to gain access to the bands adhesive flap or verlap. In this manner, a seam of the overlapped portion of the band, e.g., the flap, may be permanently secured within the clasp.

To ease alignment when affixing the clasp to the band, the clasp can include internal alignment pins that guide the two interlocking members into place as they are joined together, making it easy to apply the clasp.

Figure 1B:
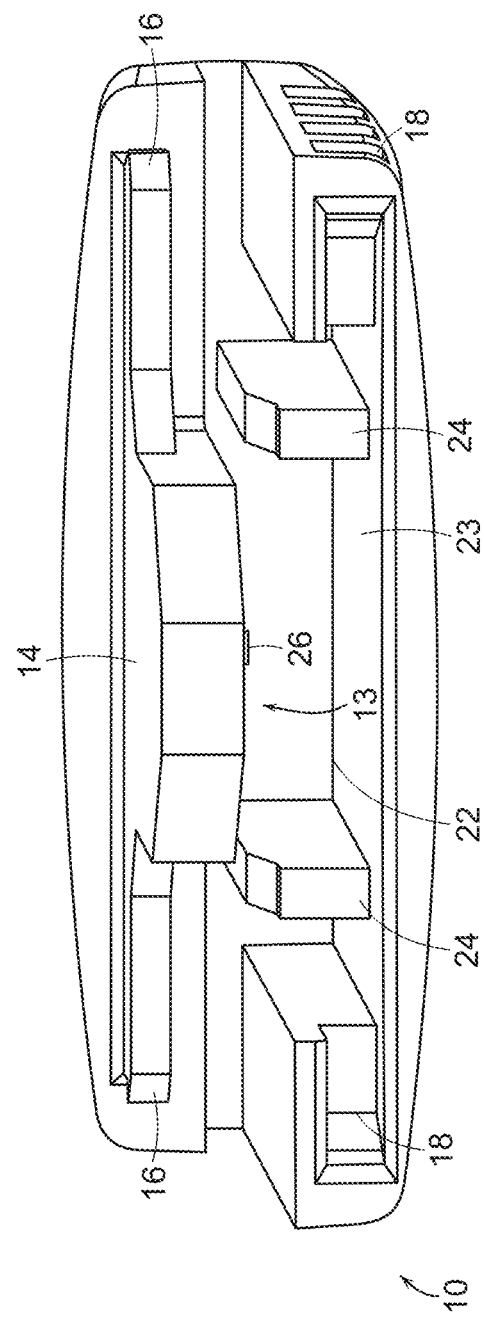
FIGS. 1B and 1C are different top oblique views of the interlocking member of FIG. 1A.
Figure 1C:
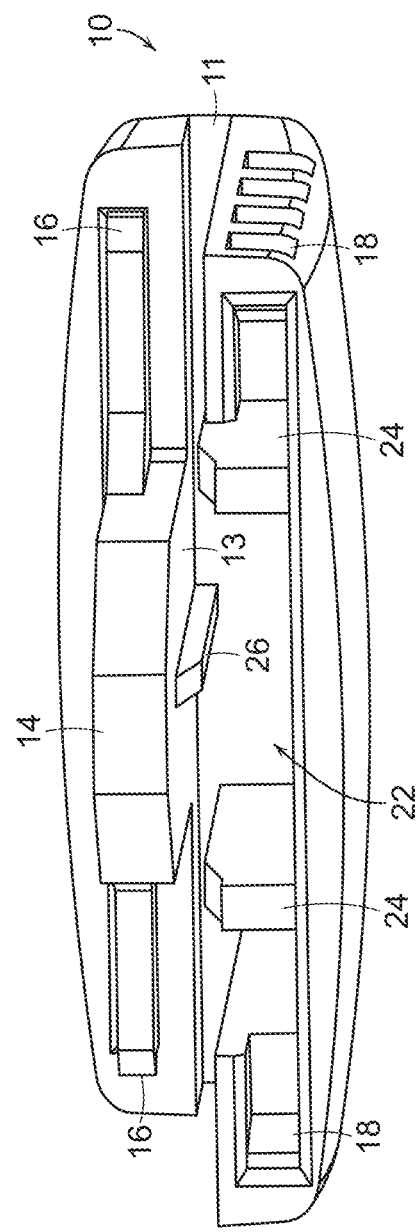
Figure 1D:
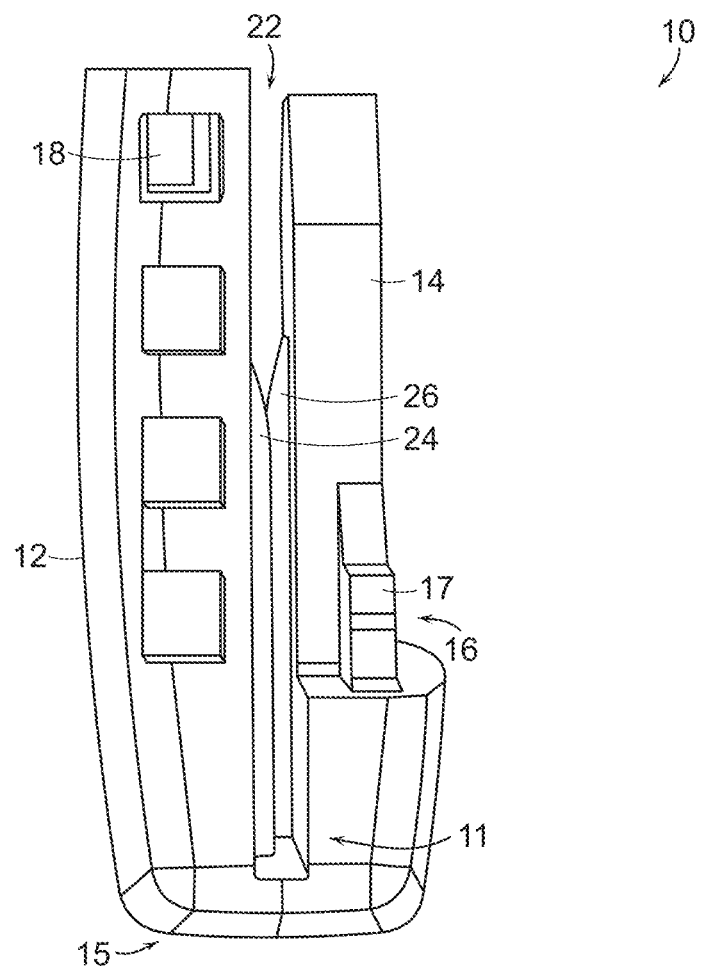
FIG. 1D is a side view of the interlocking member of FIGS. 1A through 1C.

FIG. 1A is a front view of an embodiment of an interlocking member, as one of two interlocking members used to form a clasp, according to aspects of the inventive concepts. FIGS. 1B and 1C are different top oblique views of the interlocking member of FIG. 1A. FIG. 1D is an oblique side view of the interlocking member of FIG. 1A, according to aspects of the inventive concepts.

Figure 2A:
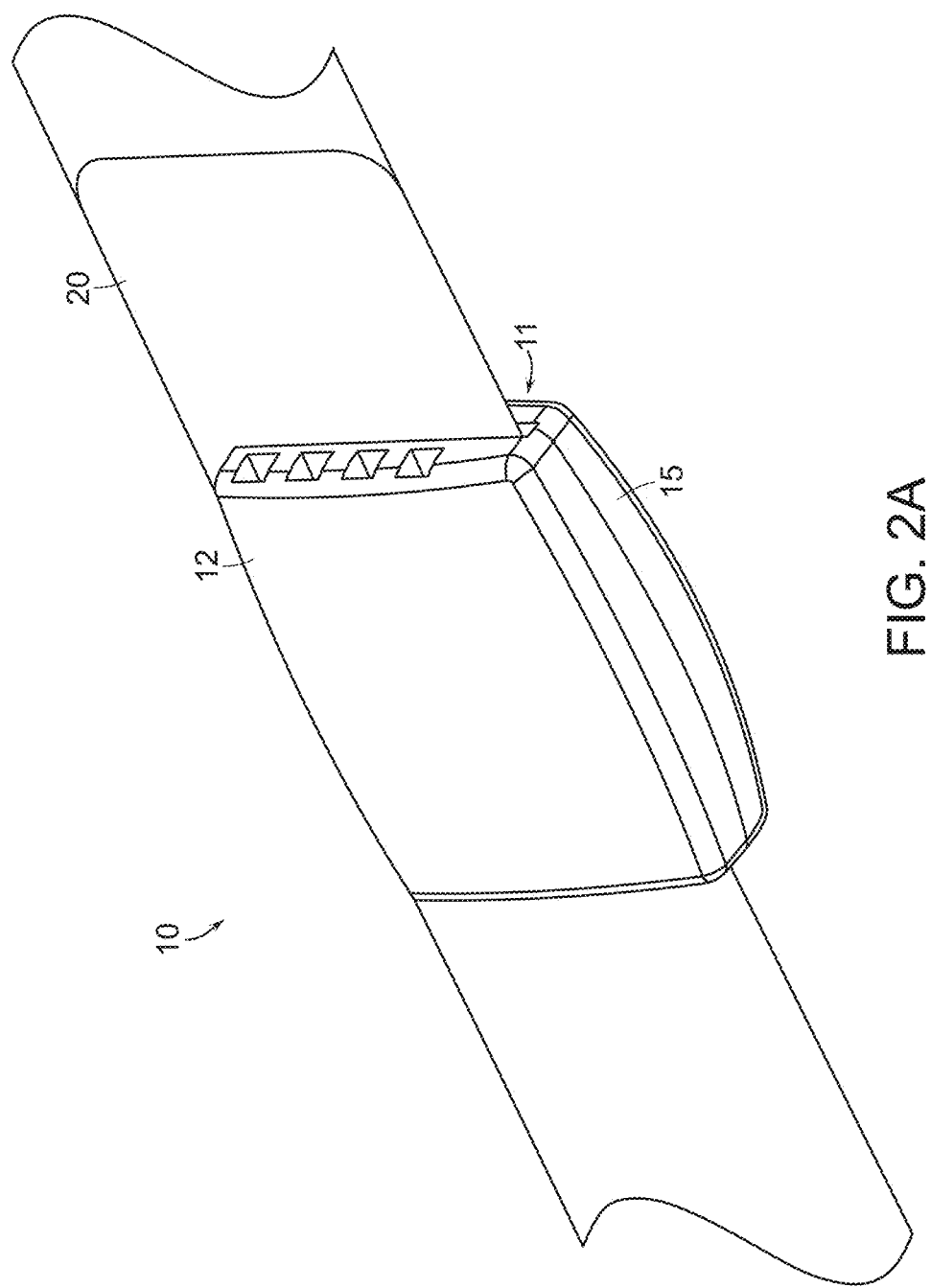
FIG. 2A shows a perspective view of an embodiment of a band disposed within the interlocking member of FIG. 1A, according to aspects of the inventive concepts.
Figure 2B:
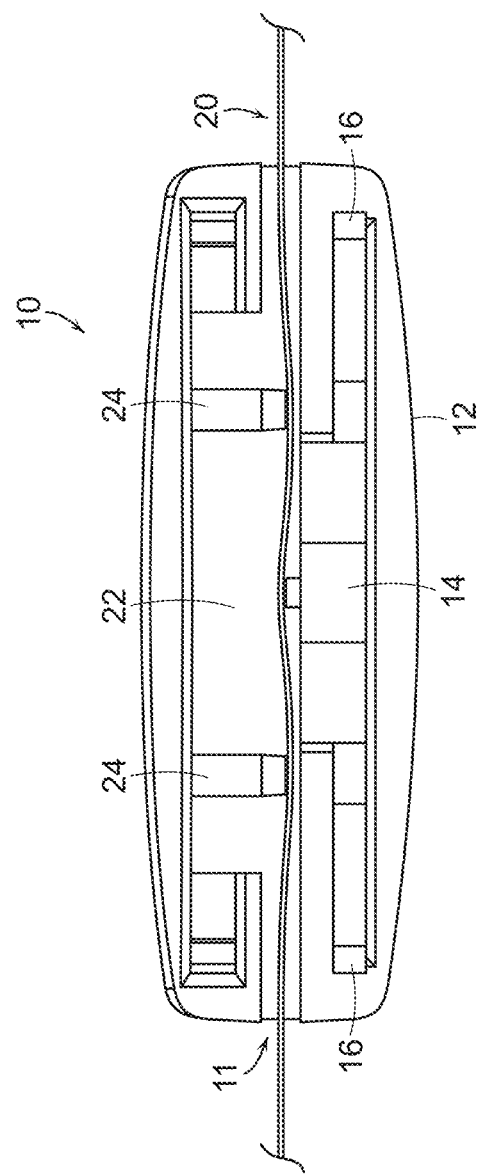
FIG. 2B shows a top view of the interlocking member and band of FIG. 2A.
Figure 2C:
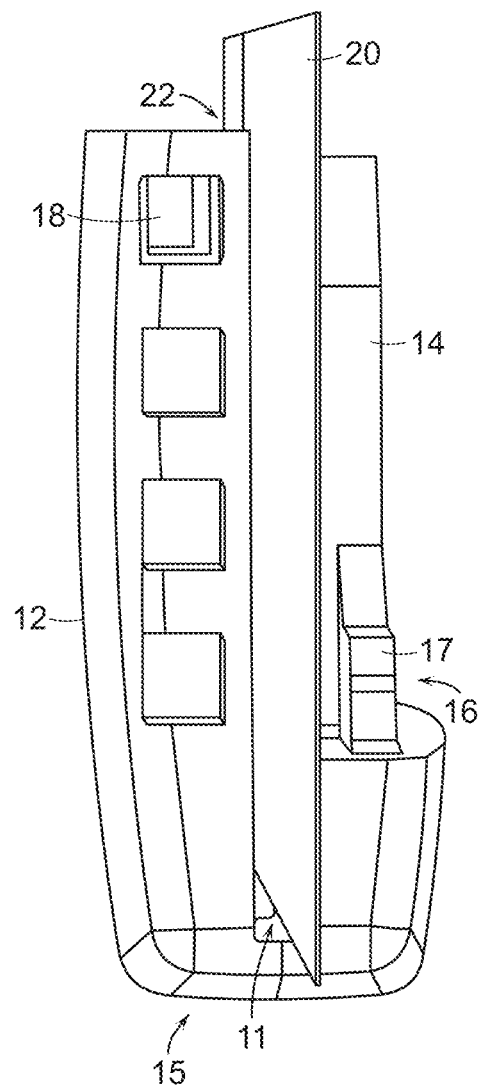
FIG. 2C shows a side view of the interlocking member and band of FIG. 2A.

FIGS. 2A through 2C show different views of the interlocking member of FIGS. 1A-1D having a band disposed therein according to aspects of the inventive concepts. FIG. 2A shows a perspective view of a band disposed within the interlocking member of FIG. 1A. FIG. 2B shows a top view of the interlocking member of FIG. 2A and FIG. 2C shows a side view of the interlocking member of FIG. 2A, according to aspects of the inventive concepts.

Figure 3A:
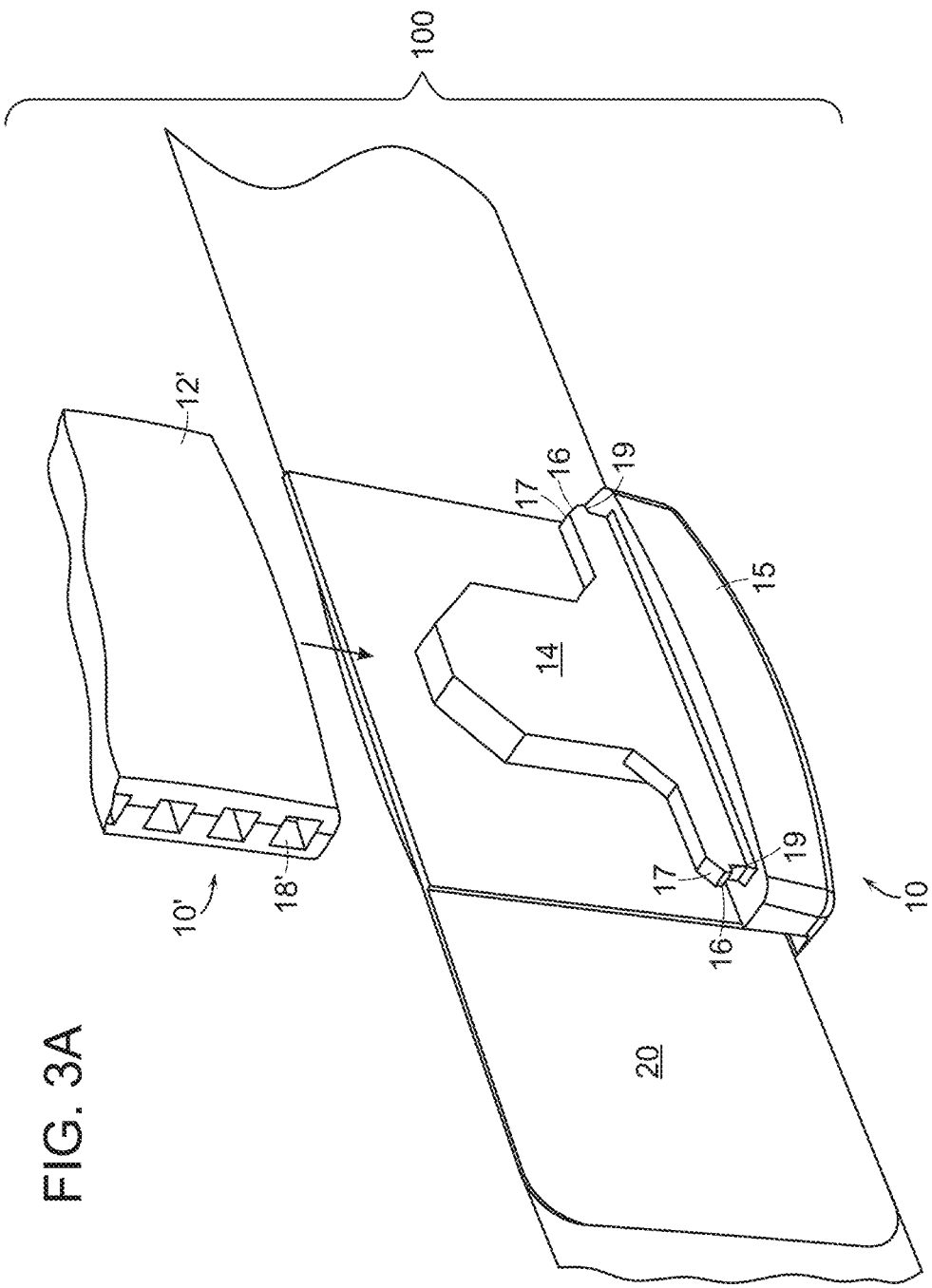
FIG. 3A shows an embodiment of a clasp in an unassembled form, having a band disposed in a first interlocking member and partially showing a second interlocking member, according to aspects of the inventive concepts.
Figure 3B:
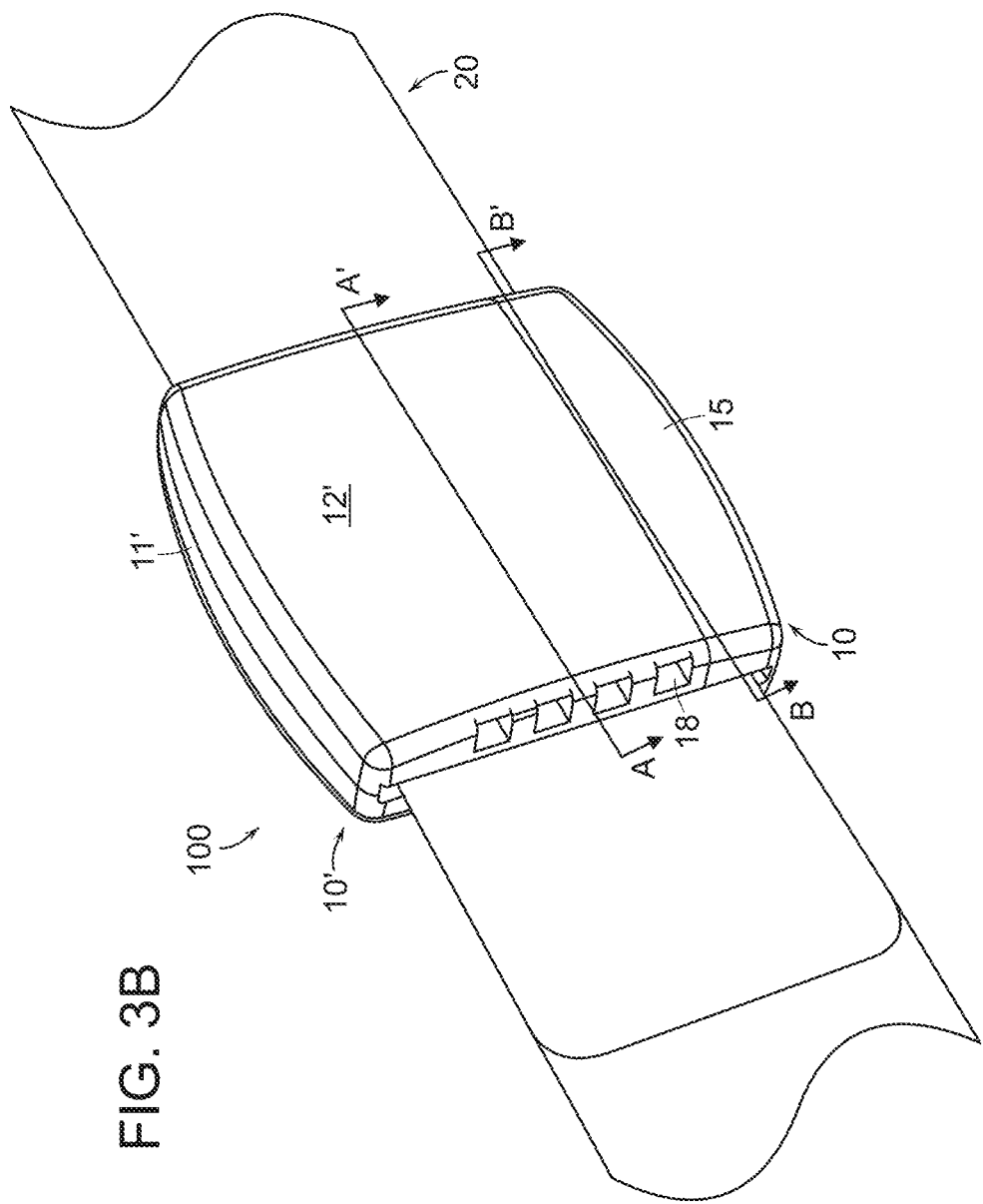
FIG. 3B shows the clasp in an assembled for with the first and second interlocking members locked together with the band secured within the clasp, according to aspects of the inventive concepts.
Figure 3D:
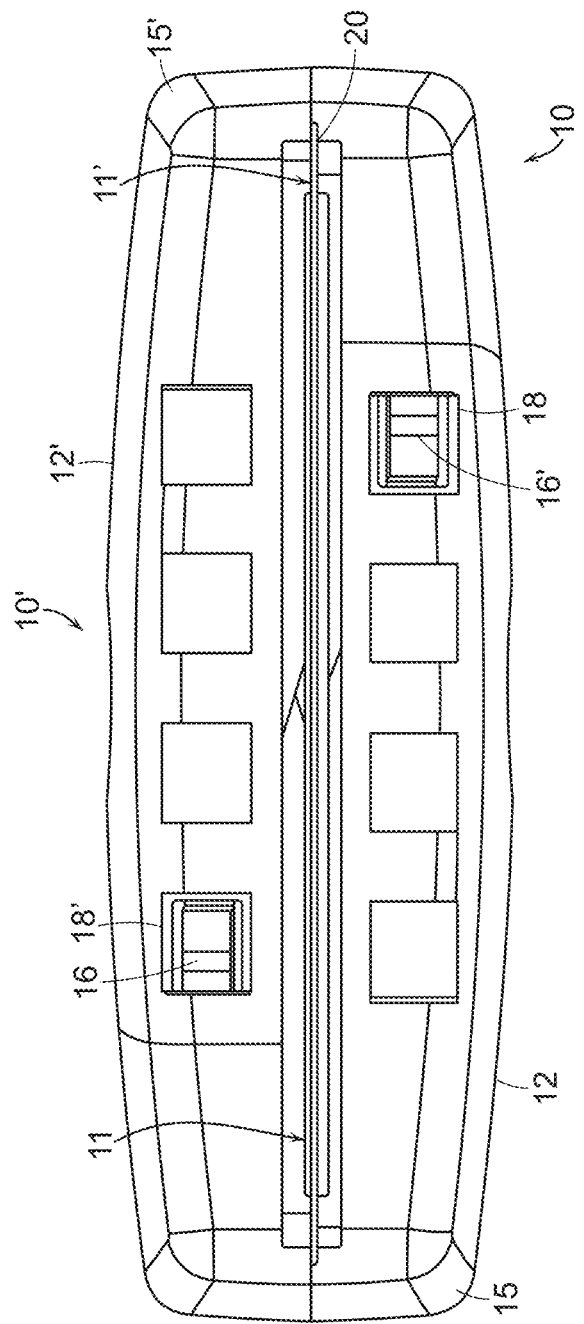
FIG. 3D is a side view of the clasp of FIG. 3B, according to aspects of the inventive concepts.
Figure 3E:
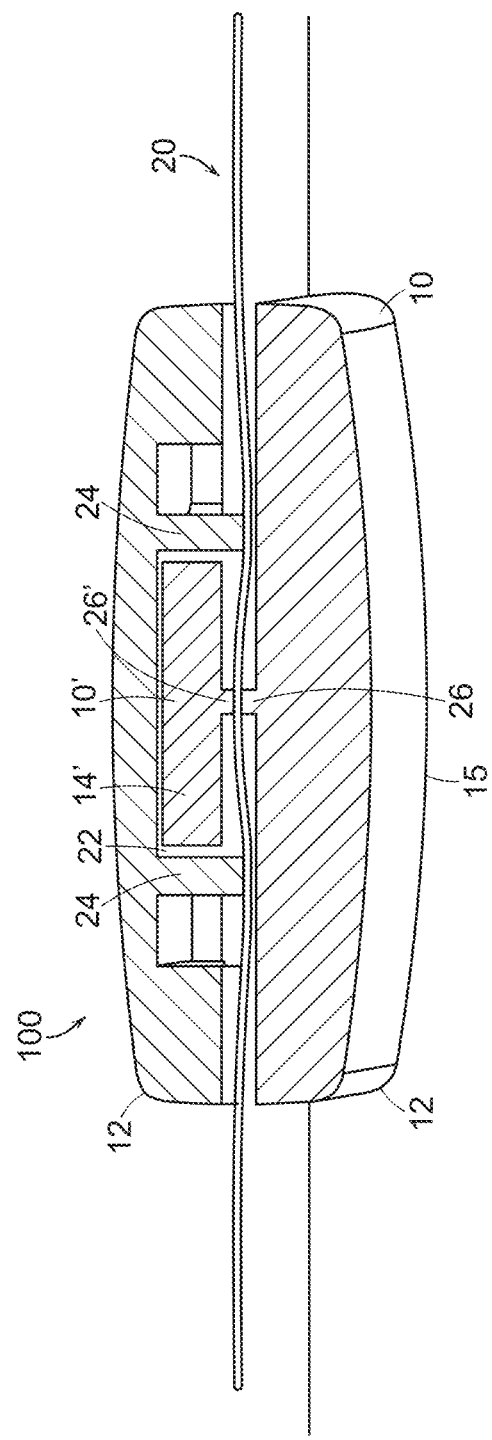
FIG. 3E is a cross-sectional oblique view of the clasp and flexible band FIG. 3B taken along line B-B', according to aspects of the inventive concepts.

FIGS. 3A and 3B shows perspective views of an embodiment of a clasp comprising two interlocking members according to aspects of the inventive concepts. FIG. 3A shows the clasp in an unassembled form, while FIG. 3B shows the clasp in an assembled for with the two interlocking members locked together. FIG. 3C is a cross-sectional oblique view of the clasp of FIG. 3B taken along line A-A', according to aspects of the inventive concepts. FIG. 3D is a side view of the clasp of FIG. 3B, according to aspects of the inventive concepts. FIG. 3E is a cross-sectional oblique view of the clasp having a flexible band within the clasp of FIG. 3B taken along line B-B' at a different angle from FIG. 3C, according to aspects of the inventive concepts.

FIGS. 1A-1C show an example embodiment of an interlocking member 10 that can be used as one of two interlocking members that combine to form a clasp 100 within which a flexible band 20 may be secured, see also FIGS. 3A-3E. In these embodiments, the two interlocking members used to form a clasp may be structurally the same, or substantially the same. That is, two interlocking members used to form a clasp can be indistinguishable, apart from any aesthetic features, such as color, texture, or structural differences not involving the interlocking mechanisms that cause the two interlocking members to permanently lock together. In various embodiments, the clasp may be structured to accommodate available 1" bands, but in other embodiments the clasp could be structured to fit ¾" and ½" bands, as examples. There are no inherent limitations on the scaling or uses of the clasp and bands.

A flexible band of material (or "flexible band", or "band") 20, for example, a strap or wrist or ankle band, may be waterproof, chemical resistant, and scratchproof. In addition, the band 20 may be stretch proof and tear proof so that it needs to be cut off to be removed. The band 20 may include at least one of a strip of polypropylene, plastic, polyester, and/or fibers, as examples.

In the example embodiment, the clasp is arranged to enclose and prevent access to a closure region of the band 20. The closure region can be a seam or an area where two portions of at least one band overlap. In FIGS. 3A-3D, for example, the interlocking member 10 is shown with an overlapped area of two ends of flexible band 20 disposed therein.

The clasp includes first and second interlocking members 10. The first and second interlocking members 10 can be identically formed pieces in this embodiment, but need not be in others. Each interlocking member 10 includes an outer shell 12 having interlocking recesses 18 formed therein. Each interlocking member 10 also includes a tongue 14 having outwardly projecting interlocking hooks 16 and a tongue receiving slot 22 formed between the tongue 14 and the outer shell 12.

In this embodiment, opposite tongue 14 there is an inner surface 23 of shell 12 forming a portion of the tongue receiving slot 22. The inner surface 23, as illustrated in FIGS. 1B and 1C, includes internal ribs 24 protruding from the inner surface 23 and forming opposing sides of the tongue receiving slot 22. In this embodiment, ribs 24 are spaced apart at a distance that is slightly greater than the width of the tongue 14 to be received in tongue receiving slot 22. Preferably, insertion of tongue 14 in tongue receiving slot 22 causes a tight fit of band 20 therein, that is, a fit that grips and compresses band 20 to render band 20 substantially immovable. The interlocking members can form, therefore, a compression fit to secure the band.

As illustrated in FIGS. 1C and 1D, the tongue 14 includes at least one protrusion 26 extending from a tongue back surface 13 and forming a portion of the tongue receiving slot 22. The protrusion 26 is configured to reduce or prevent sliding of the band 20 between the opposing interlocking members 10 when interlocked. In this embodiment, the protrusion 26 is centered in the rear of tongue 14 so that protrusions of two combined interlocking members compress band 20. But in other embodiments there may be more than one protrusion on one or both tongues of the two combined interlocking members, and the protrusion may not be centered. Each interlocking member 10 includes a base 15 from which the outer shell 12 and tongue 14 extend substantially in parallel. Within the base 15, a channel 11 is formed, at the bottom of the receiving slot 22.

In this embodiment, interlocking member 10 includes two interlocking hooks 16 and two interlocking recesses 18. In this embodiment, recesses 18 are shown as being open, creating a window through which hooks 16 can be seen when two interlocking members are combined. However, such a window is not essential, that is, recess 18 could be completely internal to the clasp and not externally visible. Each of the interlocking hooks 16 of a first interlocking member is arranged to engage and interlock with a corresponding one of the interlocking recesses 18 of a second interlocking member and each of the interlocking hooks 16 of the second member is arranged to interlock with one of the interlocking recesses 18 of the first interlocking member, so as to prevent movement between the interlocking members when interlocked. Therefore, the interlocking hooks 16 of each of the interlocking members 10 are configured to engage and snap into corresponding interlocking recesses 18 of the opposing interlocking member, securing and interlocking the two members with each other as shown in FIGS. 2A and 3A.

In the preferred embodiment, the interlocking hooks 16 are not spring-loaded or otherwise displaceable so that the interlocking members 10 are not releasable once engaged, even with a tool. As illustrated in FIGS. 1A through 1D, each of the interlocking hooks 16 includes an angled member 17 configured to facilitate insertion into a corresponding interlocking recess 18 and a stop member 19 configured to prohibit removal of the interlocking hook from the corresponding interlocking recess, see, for example, FIG. 3A.

As illustrated in FIGS. 2A through 2C, the first interlocking member 10 is shown with the flexible band 20 disposed between the tongue 14 and internal ribs 24 of the first interlocking member 10.

In an example embodiment, as illustrated in FIGS. 2B and 3E, a portion of the band 20 is positioned within the interlocking member 10 within channel 11. As such, band 20 passes by and contacts the tongue 14, opposing internal ribs 24, and protrusions 26 in a serpentine-like manner, i.e., having a non-straight path through the clasp that turns one way and another in response to the combination of ribs, protrusions and recesses within the clasp. The primary cause for this manner of the shape of band 20 within channel 11 is that protrusion 26 extends from tongue 14 partially into the channel 11, as do ribs 24 on the opposite side of channel 11. As a result, a straight-line path through the channel 11 does not exist for band 20, which bends around protrusions 26 and internal ribs 24 when disposed in channel 11. Accordingly, the band 20 is held in place when two interlocking members are combined, which substantially prevents the band 20 from sliding through the clasp. The compression imparted on the band by the structural elements that cause the serpentine-like path of the band 20 prevent the band 20 from sliding in the left and right directions within the clasp.

As illustrated in FIG. 3B, the clasp includes relatively smooth surfaces with rounded edges so as to improve comfort to an individual and to help avoid injury from the clasp while being worn. Such relatively smooth surfaces and rounded corners are not essential to the inventive concept, however.

Referring to FIGS. 3A-3E, a clasp 100 is shown formed of two interlocking members 10, 10', having band 20 secured therein.

In various embodiments, the clasp 100 may be constructed of plastic, resin, metal, or similar materials. In various embodiments, the clasp may be molded of or generated from a single material that is sufficiently flexible to permit the interlocking hooks 16 to flex/snap/engage into the interlocking recesses 18, while being strong enough to prevent easy breakage or removal of the clasp 100. In various embodiments, the clasp 100 may be constructed of Acrylonitrile Butadiene Styrene (ABS). Depending on the intended use, a softer plastic with characteristics similar to that of Poly Olefins, for example, would be avoided with respect to at least the outer protective shell of the clasp, that is, in cases where the clasp functions as a secure device.

In various embodiments, the clasp 100 includes two identical or substantially identical interlocking members 10, 10' which may be put together with the force of a hand, but do not come apart. In various embodiments, the clasp 100 includes four attachment points which substantially prevent movement between the interlocking members when interlocked. In various embodiments, the clasp 100 includes interlocking hooks 16, 16' which are not spring-loaded so that the interlocking members are not releasable once engaged, even with a tool, see, for example, FIG. 3A. In various embodiments, the clasp 100 preferably has smooth edges, that is, no sharp edges, so that the clasp cannot be turned into a weapon.

When the first and second interlocking members 10, 10' are interlocked or engaged, a tongue 14 of one interlocking member 10 fits within a tongue receiving slot 22' of the other interlocking member 10' and hooks 16 of one interlocking member 10 engage the interlocking recesses 18' of the other interlocking member 10', so as to prevent disengagement of the interlocking members 10, 10'. When the first and second interlocking members 10, 10' are interlocked, a portion of the band 20 is disposed between and in parallel with the tongues and the outer shells 12, 12' of the first and second interlocking members 10, 10'.

FIG. 3A demonstrates how first and second interlocking members 10, 10' combine to form clasp 100, in accordance with the example embodiment. The band 20 is disposed in channel 11 of first interlocking member 10, then second interlocking member 10' is placed over band 20 such that the tongue 14 of first interlocking member 10 inserts into the tongue receiving slot 22' of the second interlocking member 10' and the tongue 14' of the second interlocking member 10' inserts into the tongue receiving slot 22 of the first interlocking member 10. As the two interlocking members are pressed together, hooks 16 of the first interlocking member 10 are irremovably forced into the corresponding recesses 18' of the second interlocking member 10' and hooks 16' of the second interlocking member 10' are irremovably forced into recesses 18 of the first interlocking member 10, as is shown in the side view of FIG. 3D.

FIG. 3B shows the interlocking members 10, 10' combined to form clasp 100 and FIG. 3C shows a cross-section of clasp 100 taken alone line A-A' of FIG. 3B. In FIG. 3C band 20 is engaged and compressed between protrusions 26, 26' of the first and second interlocking members 10, 10', respectively. Similarly, band 20 may also be compressed between opposing ribs 24, 24' of first and second interlocking members 10, 10', respectively.

FIG. 3E is a cross-sectional perspective view of clasp 100 having flexible band 20 secured therein, taken along line B-B' in FIG. 3B. As is shown in FIG. 3E, band 20 is secured in a serpentine-like path through clasp 100, similar to what is shown in FIG. 2B. As is apparent from FIG. 3E, near the base 15 of interlocking member 10, tongue 14' of interlocking member 10' is pushed toward the outside of receiving slot 22 from the force of the more rigid base 15 (from which tongue 14 extends) applied to a distal end of tongue 14'. Thus, the serpentine-like bending of band 20 shown in FIG. 2B is maintained when interlocking members 10, 10' are combined. The same aspects would be realized at base 15' (not shown) of interlocking member 10'. Similarly, base 15' would push tongue 14 toward the outside of receiving slot 22', when band 20 is compressed between the interlocking members 10,10'. Therefore, in this embodiment, the serpentine-like bending of band 20 at base 15' of interlocking member 10' would be opposite that shown for base 15 of interlocking member 10.

In other embodiments, the clasp may include other types of devices and/or sensors embedded therein, for example, a RFID chip, wander sensors, medical monitoring devices, a Bluetooth communication device, and/or GPS tracking devices. The interlocking members that form such a clasp may be as otherwise described above, that is, with respect to FIGS. 1A-1D, 2A-2C, and 3A-3E.

Figure 4A:
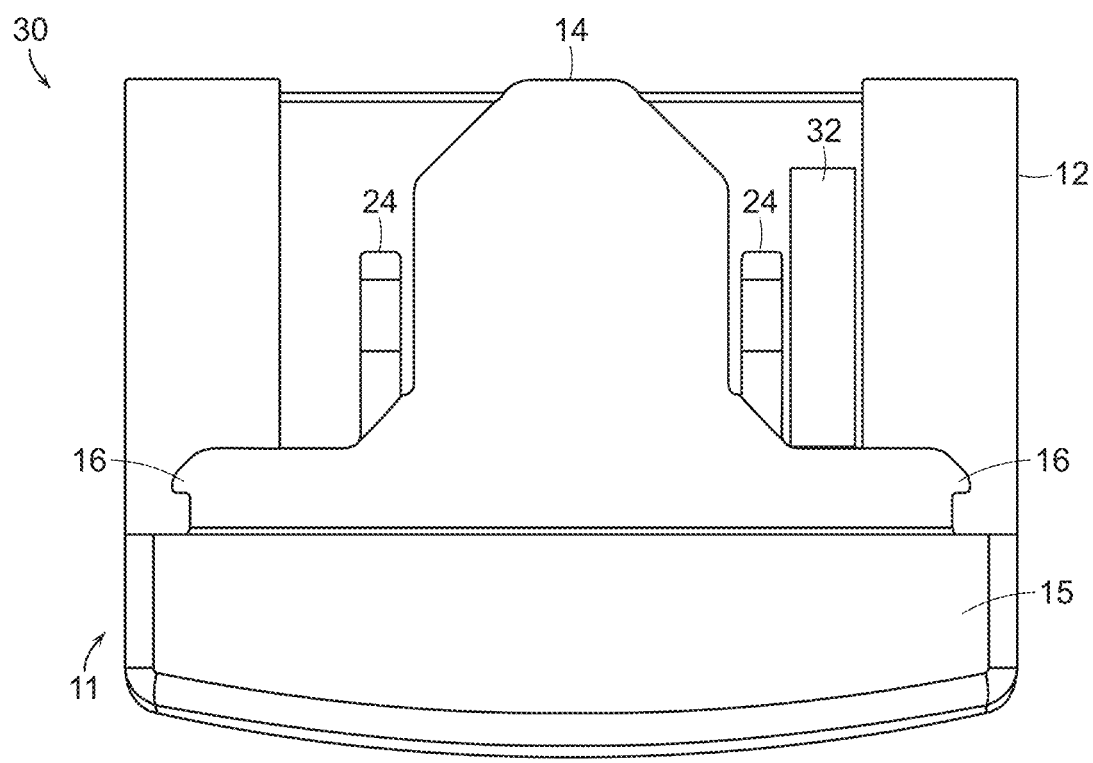
FIG. 4A is a front view of an embodiment of an interlocking member having a passive radio frequency identification (RFID) chip, according to aspects of the inventive concepts.
Figure 4B:
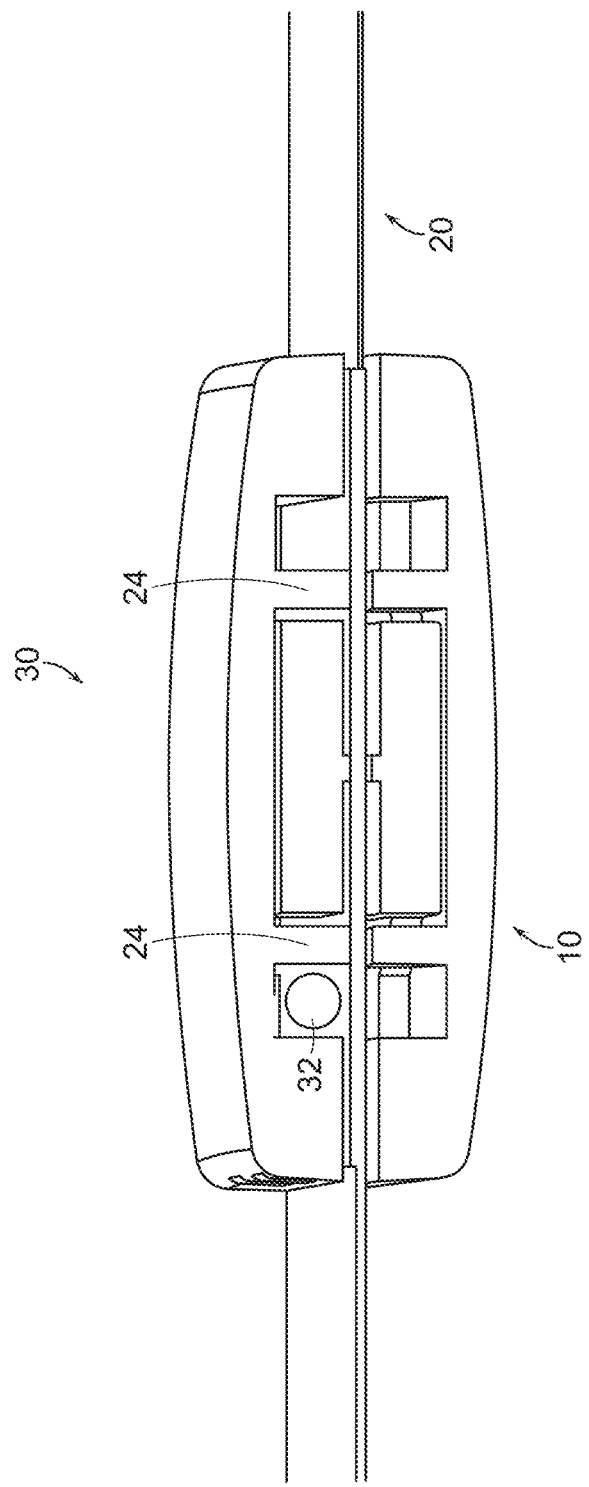
FIG. 4B is cross-sectional oblique view of the interlocking members of FIGS. 1A-1D and FIG. 4A interlocked to form a clasp that is cut along line A-A' as in FIG. 3A, according to aspects of the inventive concepts.
Figure 5A:
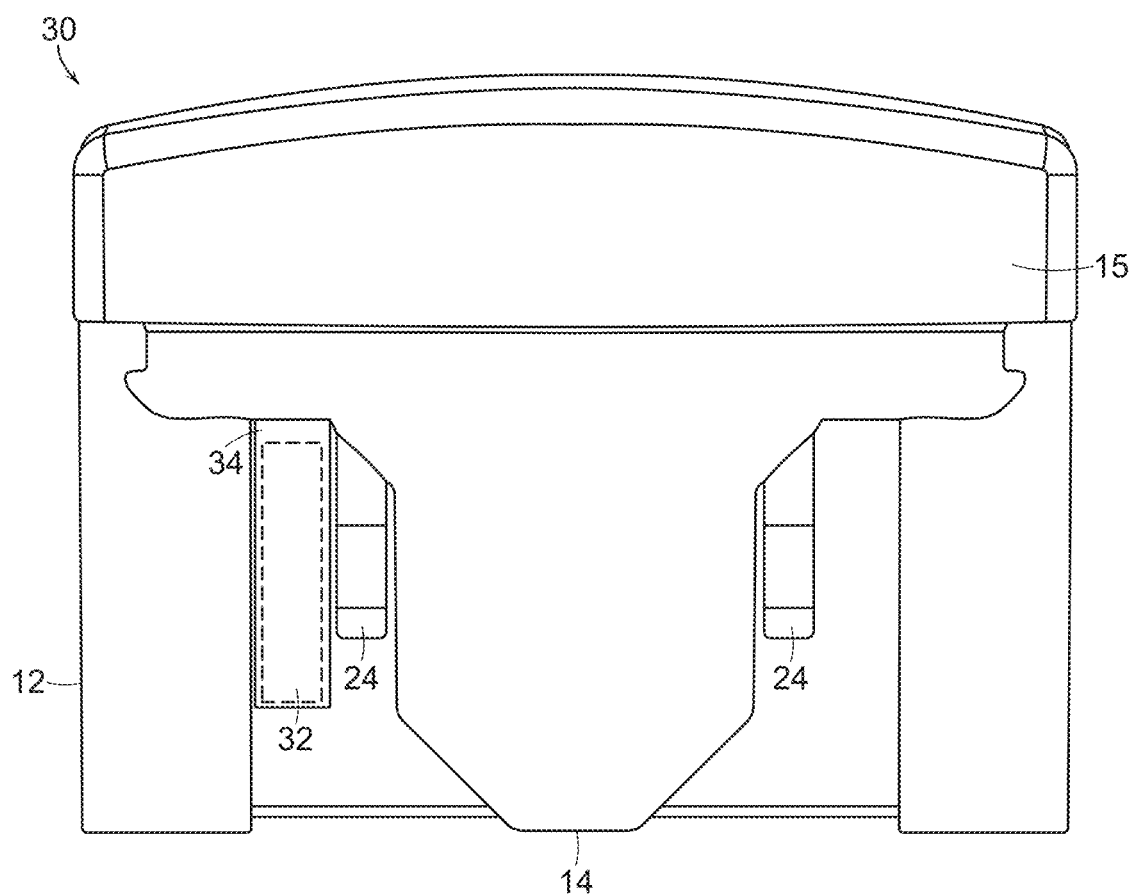
FIG. 5A is a front view of an embodiment of an interlocking member having a passive radio frequency identification (RFID) chip, according to aspects of the inventive concepts.
Figure 5B:
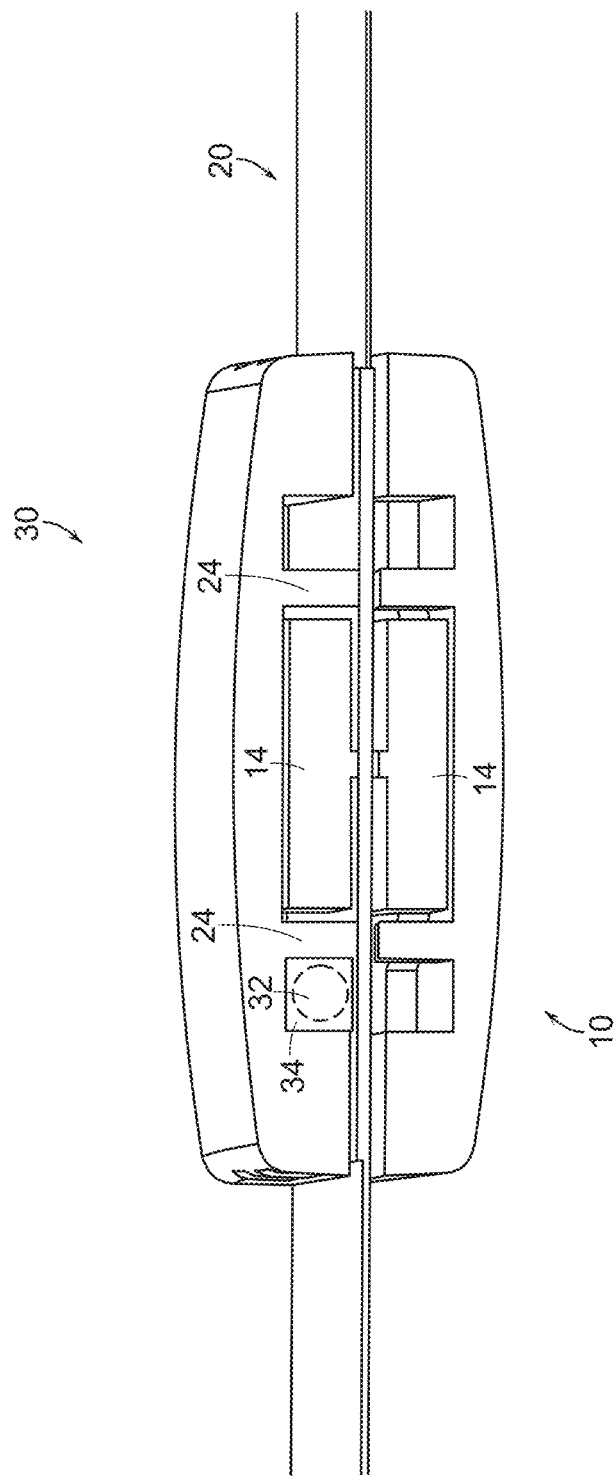
FIG. 5B is cross-sectional oblique view of the interlocking members of FIGS. 1A-1D and FIG. 5A interlocked to form a clasp that is cut along line A-A' as in FIG. 3A, according to aspects of the inventive concepts.

FIGS. 4A and 5A are rear views of an embodiment of an interlocking member of a clasp having a passive radio frequency identification (RFID) chip, according to aspects of the inventive concepts. FIGS. 4B and 5B are cross-sectional oblique views of the interlocking members of FIGS. 4A and 5A, respectively, forming part of a clasp that is cut along line A-A' as in FIG. 3A, according to an example embodiment of the inventive concept.

In FIGS. 4A and 5A, the interlocking members 30 are similar to the interlocking members 10, 10', as discussed above. The interlocking members 30 of FIGS. 4A, 4B, 5A and 5B further include a passive RFID chip 32. The passive RFID chip 32 relies on a reader of the RFID chip as its power source, in this embodiment.

In FIGS. 4A and 4B, the RFID chip 32 may be coupled to the interlocking member 30 by adhesive, such as glue. In FIGS. 5A and 5B, a pocket 34 is molded onto the interlocking member 30 between one of the internal ribs 24 and the outer shell 12 and the RFID chip 32 is inserted therein.

In FIGS. 4A, 4B, 5A and 5B, the RFID chip 32 is located between one of the internal ribs 24 and the outer shell 12. In FIGS. 4A and 4B, the RFID chip 32 is located between the inner surface 23 and a surface of the internal ribs 24 which interfaces with the band 20. In FIGS. 5A and 5B, the pocket 34 is located between the inner surface 23 and a surface of the internal ribs 24 which interfaces with the band 20.

Figure 6B:
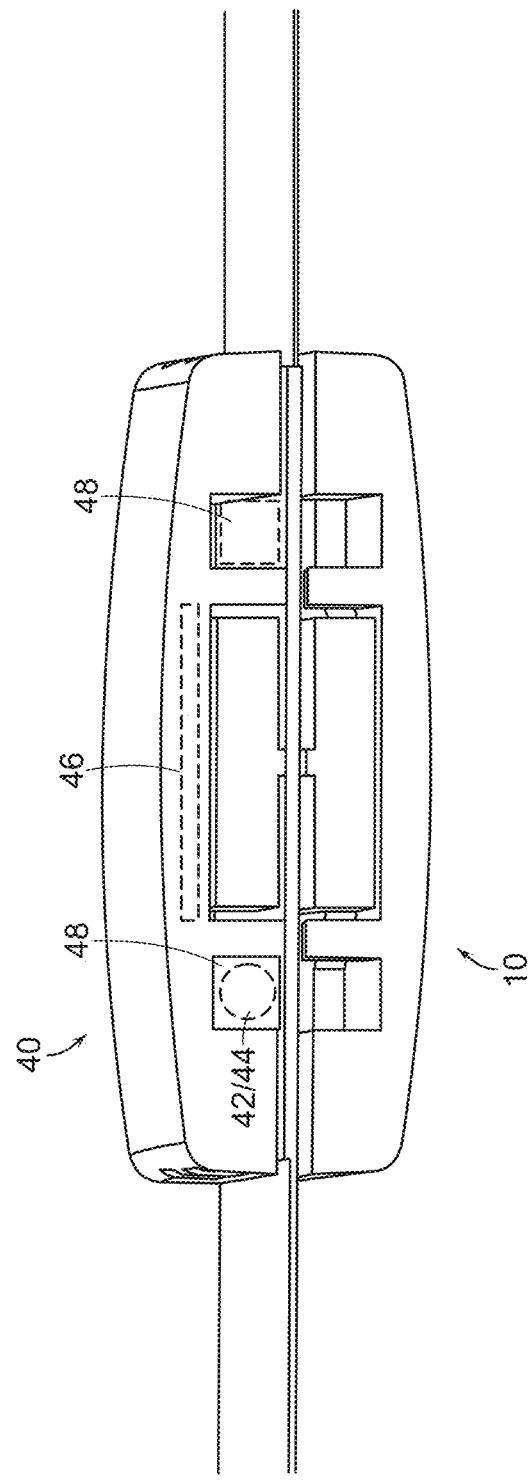
FIG. 6B is a cross-sectional oblique view of the assembled interlocking members of FIG. 6A forming a clasp that is cut along line A-A' as in FIG. 3A, according to aspects of the inventive concepts.
Figure 7A:
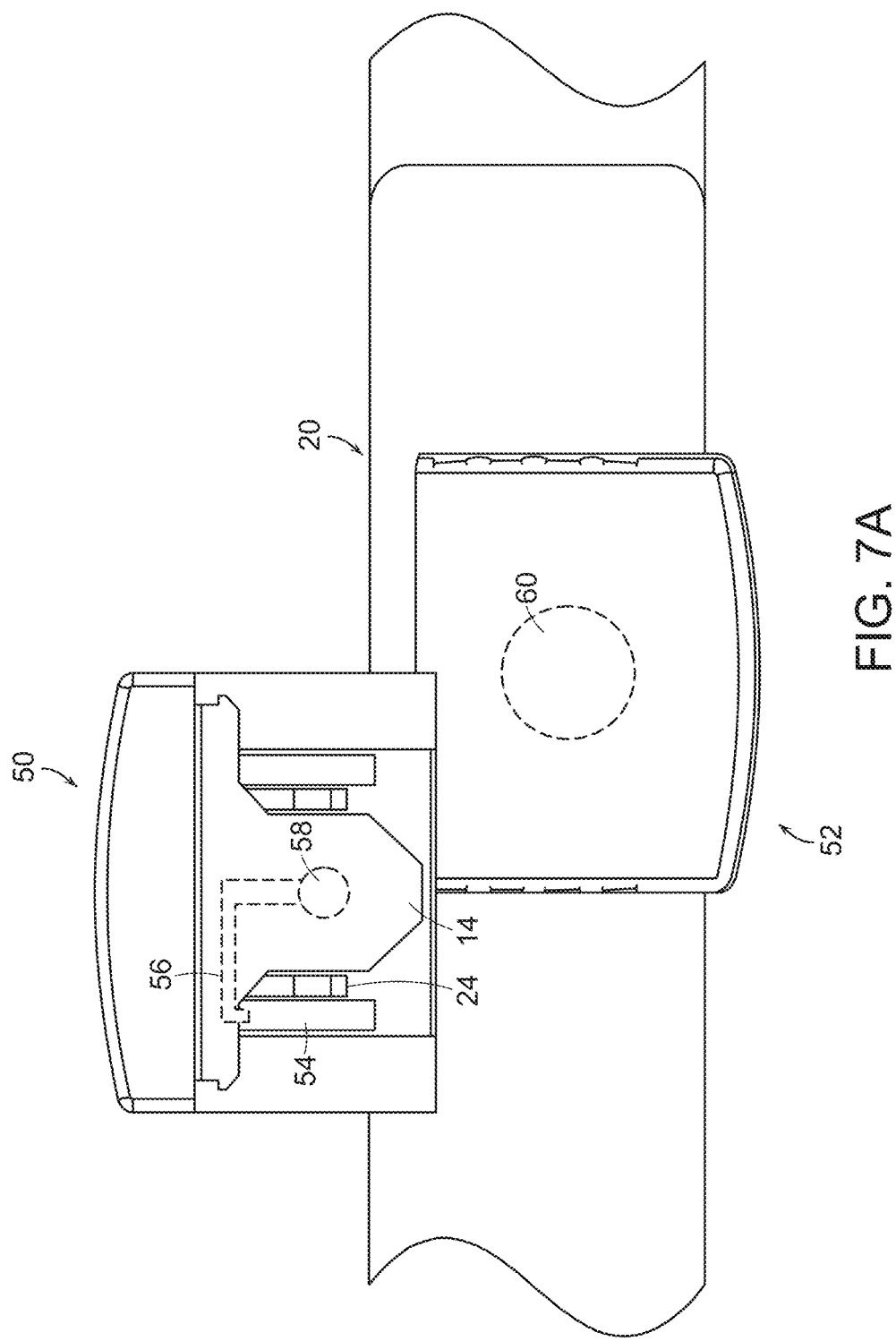
FIG. 7A is an unassembled view of an embodiment of two interlocking members of a clasp incorporating an active RFID chip, according to aspects of the inventive concepts.
Figure 7B:
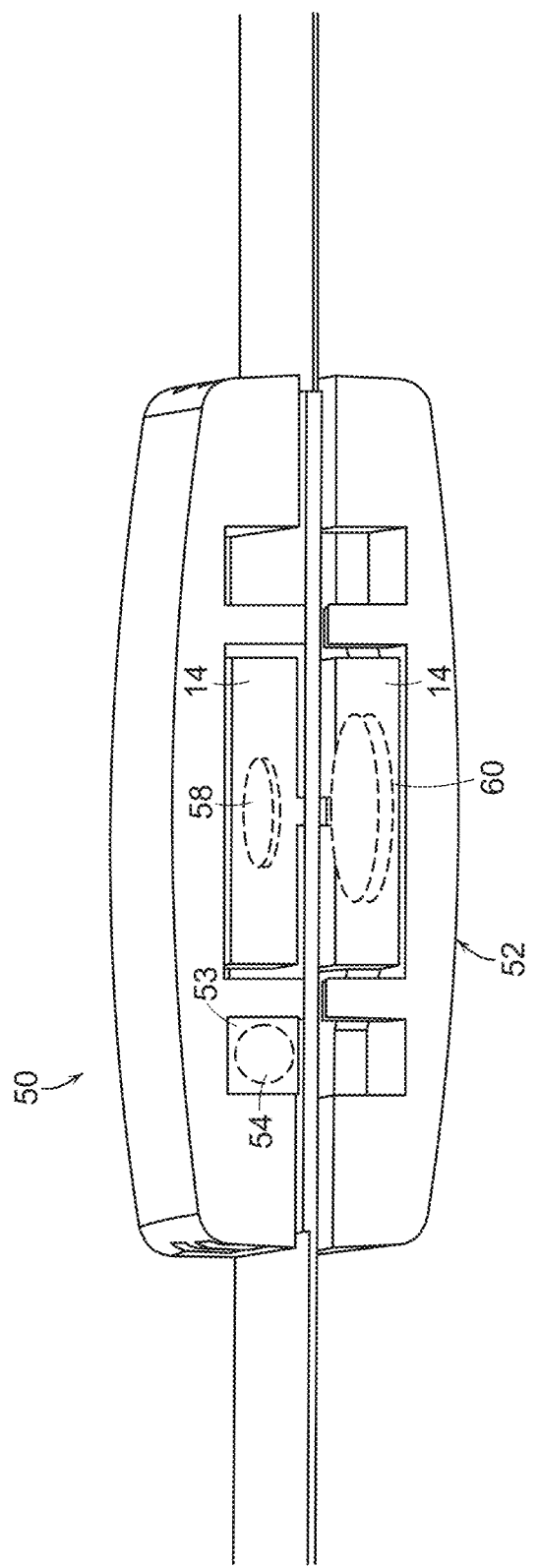
FIG. 7B is a cross-sectional oblique view of the assembled interlocking members of FIG. 7A forming a clasp that is cut along line A-A' as in FIG. 3A, according to aspects of the inventive concepts.

FIGS. 6A and 7A are illustrative views of two interlocking members of a clasp in unassembled form, with at least one interlocking member in each figure having an active RFID chip, according to an example embodiment of the inventive concept. FIGS. 6B and 7B are cross-sectional oblique views of the interlocking members of FIGS. 6A and 7A, respectively, assembled to form the clasp, with the cross section cut along line A-A' as in FIG. 3A, respectively, according to an example embodiment of the inventive concept. In various embodiments of the interlocking members, the active RFID chips use internal batteries to power their circuits.

FIGS. 6A and 6B illustrate embodiments where both an active RFID chip 42 and a battery 44 are formed on or disposed within a single interlocking member of a clasp 40. That is, the active RFID chip 42 and the battery 44 are only formed on one of the interlocking members of the clasp, in this embodiment, namely clasp 40. The active RFID chip 42 and the battery 44 are coupled by circuitry 46. Pockets 48 are molded into the interlocking member 40 between each of the internal ribs 24 and the outer shell 12 and the RFID chip 42 and the battery are inserted therein, respectively. In FIGS. 6A and 6B, the pockets 48 are located between the inner surface 23 and a surface of the internal ribs 24 which interfaces with the band 20.

In this embodiment, a switch is formed on an external face of the interlocking member such that the active RFID chip 42 is activated when the interlocking members are engaged or interlocked. In an alternative embodiment, the active RFID chip 42 is activated prior to the interlocking members being engaged or interlocked.

FIGS. 7A and 7B illustrate an embodiment where an active RFID chip 54 is formed on one of the interlocking members of the clasp, namely, interlocking member 50, and a battery 60 being formed on the other of the interlocking members of the clasp, namely, interlocking member 52. The active RFID chip 54 is coupled to or electrically interface with an exposed contact 58 by circuitry 56. The exposed contact 58 is on the tongue 14 of the interlocking member 50. In an example embodiment, the contact 58 is formed on the top of the tongue 14.

The battery 60 can be inserted or molded into the plastic or other material of the interlocking member 52. In one example embodiment, the battery 60 is formed on the inner surface 23 of the interlocking member 52. In one example embodiment, the battery 60 is disk-shaped; however, the present inventive concepts are not limited thereto. The battery 60 has an exposed contact thereon by which it can deliver voltage to the circuit.

The exposed contact 58 on the tongue 14 will come in contact with the underside of the exposed contact on the battery 60 when the interlocking members of the clasp are interlocked together, thereby activating the active RFID chip.

FIGS. 8A through 8F show an alternative embodiment of an interlocking member used to form a clasp, according to aspects of the inventive concept. Like the above embodiments, two interlocking members 80 can be press fit together to permanently engage to form the clasp, with a band secured therein between the two interlocking members 80. In some embodiments, it may be preferable to have an overlapping portion of the band secured within the clasp to mitigate against peeling the band apart. In accordance with this embodiment, improved security and resistance to tampering are provided. Additionally, or alternatively, improved band gripping can also be realized through this embodiment. In various embodiments, the two interlocking members include interlocking mechanisms that are compatible to form a secure clasp. In some embodiments, the interlocking mechanisms can the identical or substantially identical.

For example, improved security can be provided by preventing external access to the hooks 16 of each interlocking member that engage the recesses 18 of the other interlocking member. Additionally, an element may be included in the clasp to provide greater compressive force to a band maintained within the clasp. Such additional compressive force may be imparted, for example, by providing greater contact area between internal components of the clasp (or interlocking members) and the band maintained therein and/or the internal components of the clasp can be formed to provide greater compressive force to the band. The greater compressive force reduces the possibility of slippage of the band within the clasp, e.g., to avoid displacing the band to expose the overlapped band portion originally disposed within the clasp.

Figure 8A:
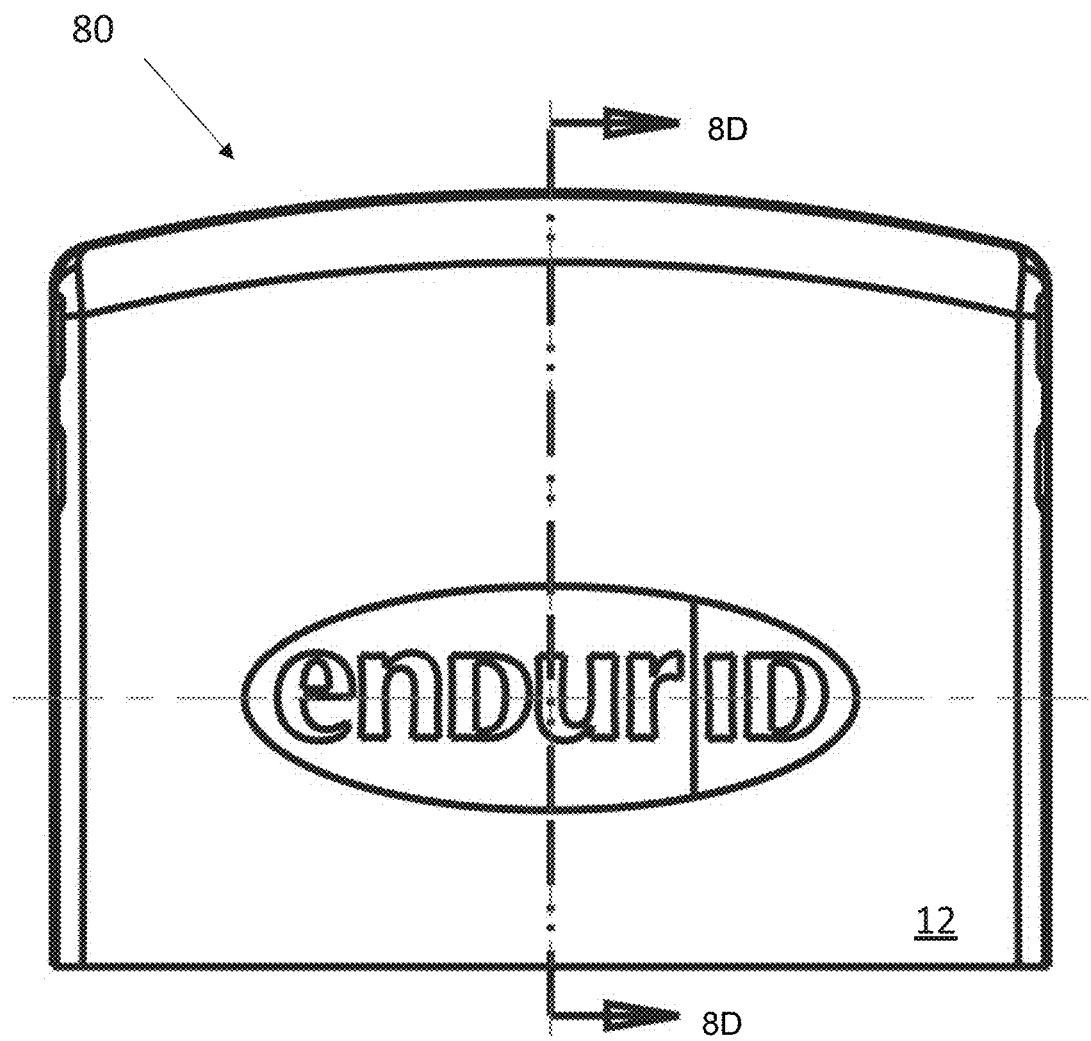
FIG. 8A is a front view of an alternative embodiment of an interlocking member of a clasp, according to aspects of the inventive concepts.
Figure 8B:
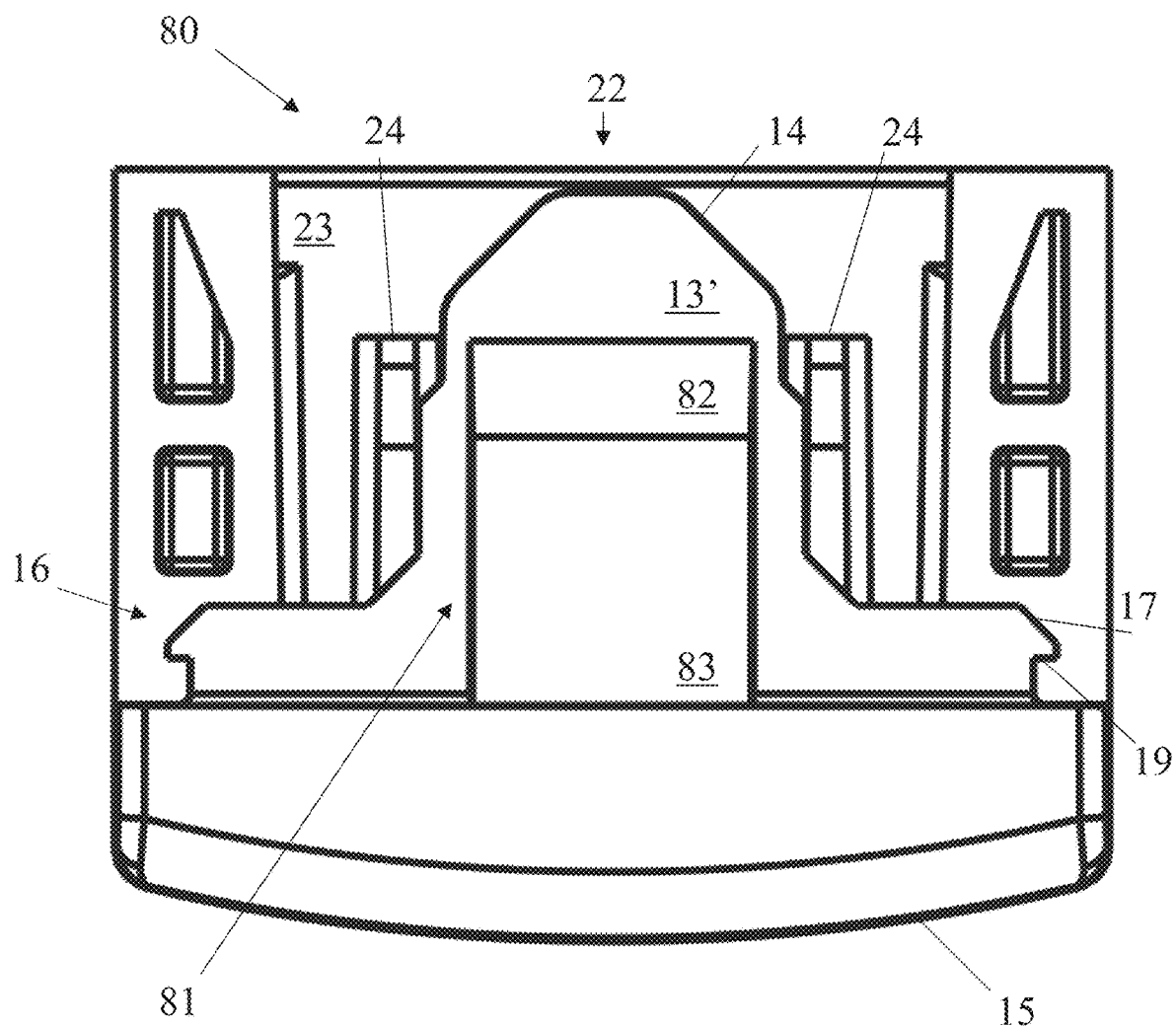
FIG. 8B is an illustrative rear view of the interlocking member of FIG. 8A, according to aspects of the inventive concepts.
Figure 8C:
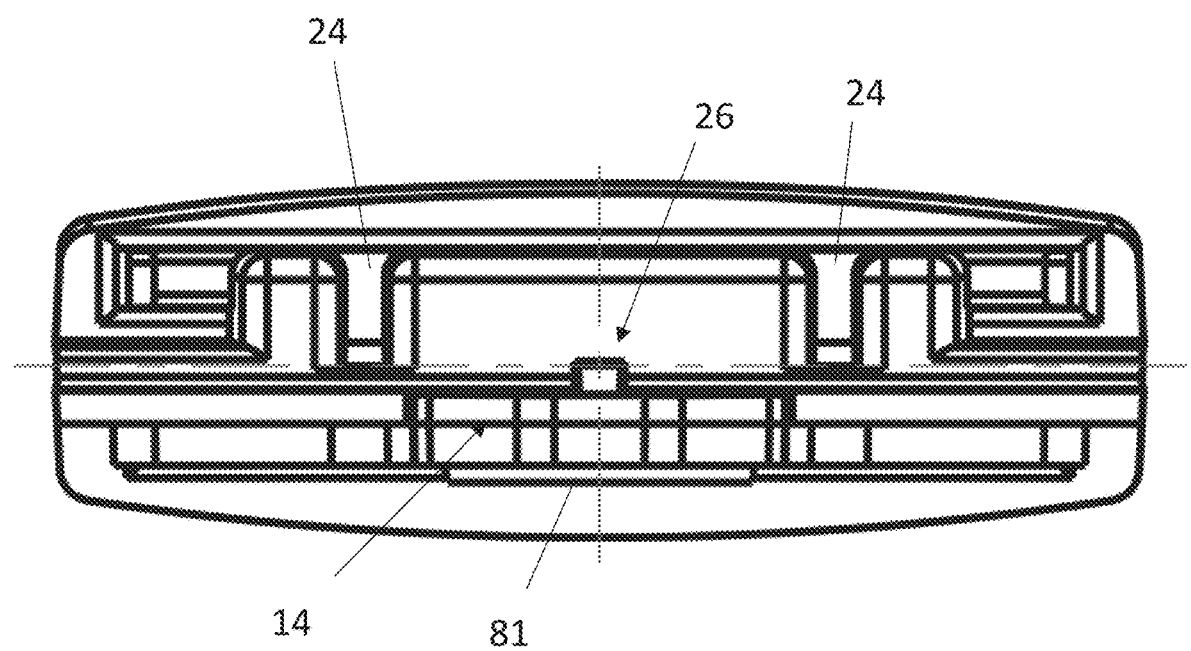
FIG. 8C is a top view of the interlocking member of FIG. 8A, according to aspects of the inventive concepts.
Figure 8D:
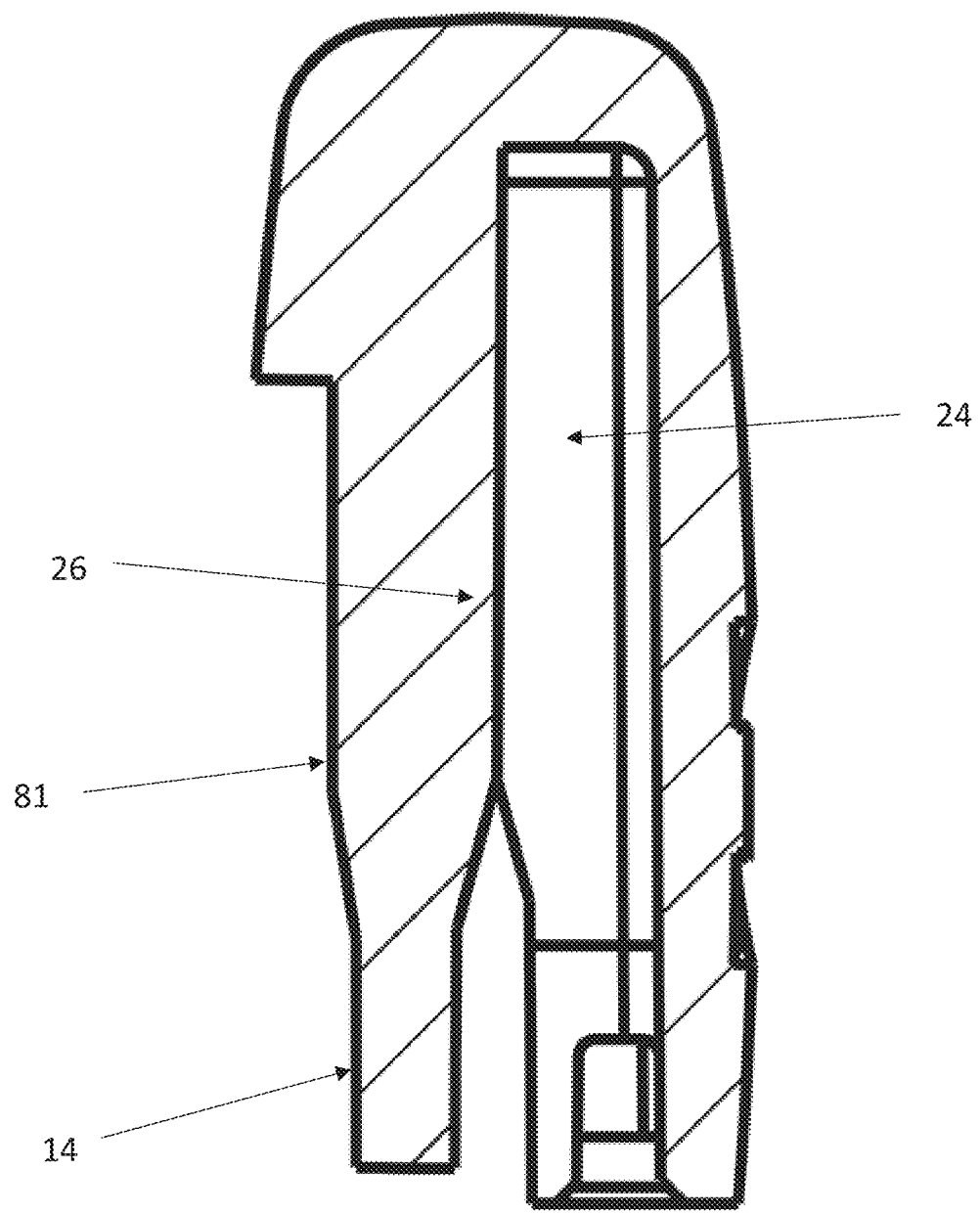
FIG. 8D is a cross-sectional side view of the interlocking member of FIG. 8A taken along line 8D-8D, according to aspects of the inventive concepts.
Figure 8E:
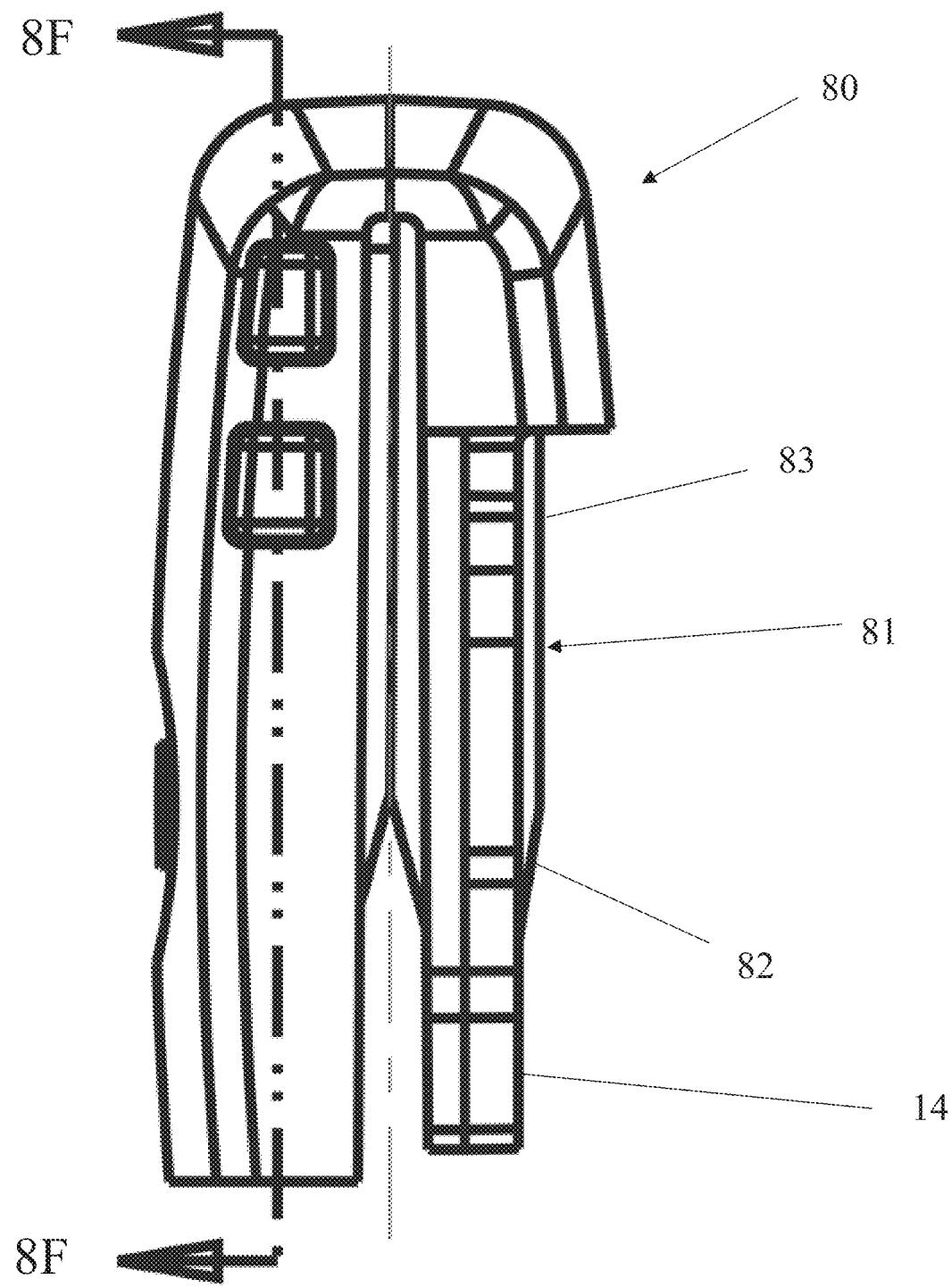
FIG. 8E is a side view of the interlocking member of FIG. 8A, according to aspects of the inventive concepts.
Figure 8F:
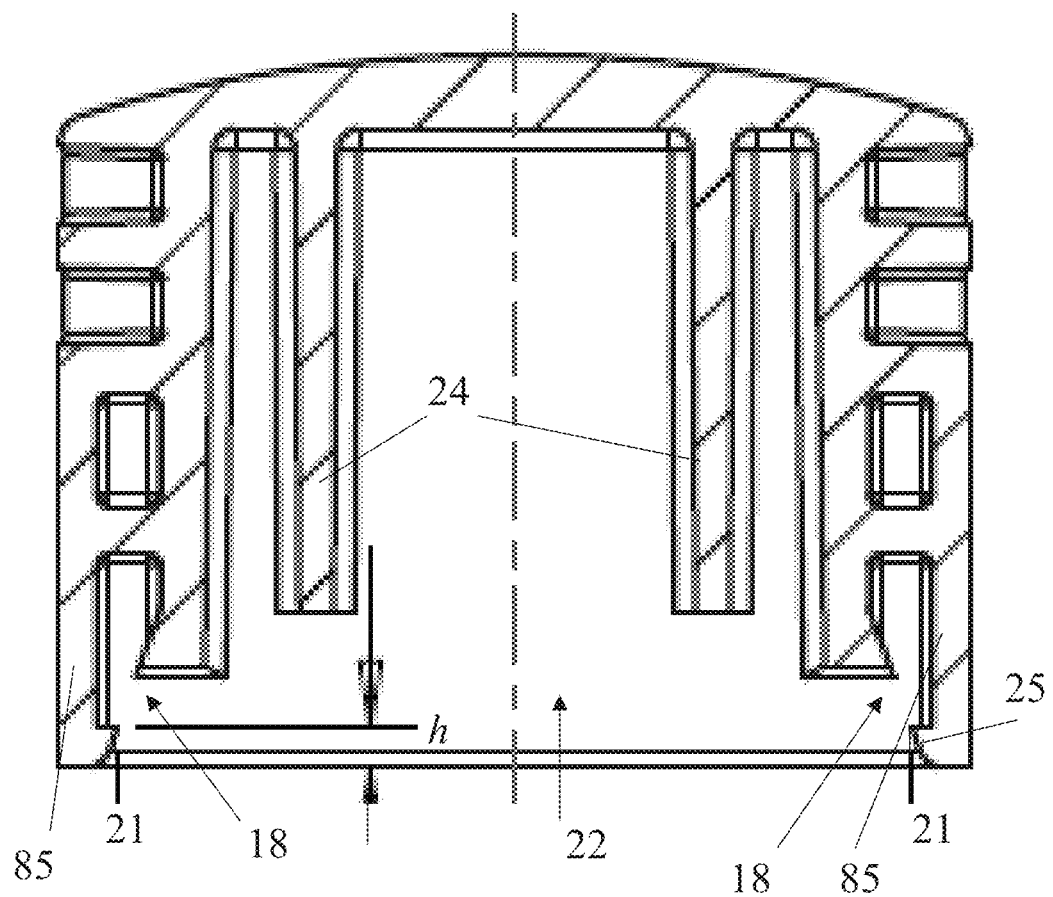
FIG. 8F is a cross-sectional elevated view of the interlocking member of FIG. 8E taken along line 8F-8F, according to aspects of the inventive concepts.

FIG. 8A is an illustrative front view of an alternative embodiment of an interlocking member of a clasp, according to aspects of the inventive concepts. FIG. 8B is an illustrative rear view of the interlocking member of FIG. 8A, according to aspects of the inventive concepts. FIG. 8C shows a top view of the interlocking member of FIG. 8A. FIG. 8D is a cross-sectional side view of the interlocking member of FIG. 8A taken along line 8D-8D, according to aspects of the inventive concepts. FIG. 8E is a side view of the interlocking member of FIG. 8A, according aspects of the inventive concepts. FIG. 8F is a cross-sectional elevated view of the interlocking member of FIG. 8E taken along line 8F-8F, according to aspects of the inventive concepts.

FIG. 8A shows a front view of an embodiment of a single interlocking member. This view shows an outer shell portion 12 of the interlocking member. From this view, interlocking member 80 is substantially similar to the interlocking members of the other embodiments disclosed herein.

FIGS. 8B, 8C, 8D, and 8E show a difference of interlocking member 80 of this alternative embodiment when compared to the interlocking member embodiments described in connection with FIGS. 1A-1D above, for example. In this embodiment, interlocking member 80 may include a tongue biasing member in the form of at least one raised portion, or bump 81, formed on a front surface 13' of tongue 14, opposite tongue back surface 13. Bump 81 protrudes up from the tongue front surface 13', opposite rib 26 on the tongue back surface 13, for example. The interlocking member 80 includes internal ribs 24 protruding from the inner surface 23 and forming opposing sides of a tongue receiving slot 22. Tongue 14 has a width that is no greater than a width of the tongue receiving slot 22. Similarly, bump 81, which may be considered to form part of tongue 14, has a width that is no greater than a width of the tongue receiving slot 22.

In the embodiment of FIGS. 8B, 8C, 8D and 8E, the bump 81 extends between the base 15 and a top of the tongue 14. The bump 81 can include an inclined portion 82 that extends at an angle from the tongue front surface 13', beginning at or near a top portion of the tongue 14, toward the base 15. The inclined portion 82 may advantageously provide a smooth coupling of two interlocking members 80 when they are press fit together to form a clasp. The bump 81 can also include an intermediate portion formed between the inclined portion 82 and the base 15. The intermediate portion can be a flat portion 83 that extends from the inclined portion 82 to or near the base 15. In this embodiment, the top surface of the flat portion 83 extends in parallel to the top surface of the tongue 14. The top surface of the flat portion 83 has a predetermined and uniform height above the tongue front surface 13', which does not extend beyond an outer surface of the base 15.

While the bump 81 in this embodiment is shown as a flat portion having uniform thickness, in other embodiments, the bump 81 can take the form of a discontinuous set of protrusions collectively forming bump 81. In some embodiments, the set of protrusions could be arranged vertically, horizontally, crosswise, or some combination thereof. In other embodiments the set of protrusions can take the form or include prongs extending from the tongue front surface 13'.

While bump 81 is shown to include the inclined portion 82 and the flat portion 83 in the depicted embodiment, in other embodiments, bump 81 could include the inclined portion 82, but not the flat portion 83, or, as an alternative, bump 81 could include the flat portion 83, but not the inclined portion 82.

In still other embodiments, the bump 81 need not extend to or near base 15. That is, the bump 81 may only extend partially down the tongue 14. In still other embodiments, the bump 81 could extend halfway or less down the tongue 14.

Bump 81 biases the tongue 14 towards the band 20 (or center of the clasp) when one interlocking member 80 is mated with another interlocking member 80, resulting in a greater applied force and a stronger hold of the band 20 therein. Accordingly, bump 81 provides a tighter fit between interlocking members such that it is more difficult to move a band compressed between two tongues of two engaged interlocking members.

FIG. 8F shows a cross-sectional view of the interlocking member 80, exposing some of the internal structure of the apparatus. As with the other embodiments, interlocking member 80 includes two interlocking hooks 16 and two interlocking recesses 18. Each of the interlocking hooks 16 includes an angled member 17 configured to facilitate insertion into a corresponding interlocking recess 18 and a stop member 19 configured to prohibit removal of the interlocking hook 16 from the corresponding interlocking recess 18, see, for example, FIGS. 3A and 8A.

FIG. 8F also shows that the recess 18 includes a detent 21 configured to maintain the hook 16 of a corresponding interlocking member 80 within the recess 18 when two interlocking members are press fit together. Detent 21 also forms part of the recesses 18 of the embodiments above. When press fit together to form a clasp, the detent 21 of recess 18 of one interlocking member abuts against the stop member 19 of the hook 16 of the other interlocking member. A height h of the detent 21 is chosen to make a snug fit with stop 19, so the two interlocking members are tightly press fit and maintained together.

Each detent 21 also includes an angled wall 25 that receives the angled member 17 of a hook 16 of another interlocking member 80. The angled wall 25 of the detent 21 and the angled member 17 of the hook 16 allow the hook to be wedged into the recess as the two interlocking members are press fit together. In this embodiment, either the recess 18 or hook 16 or both have sufficient give to enable the press fit, with the hook 16 and recess having their original shapes once press fit together so that the detent 21 and stop member 19 are abutted to maintain the hook 16 in the recess 18.

Additionally, in this embodiment, recesses 18 are closed off by closed wall 85, such that hooks 16 cannot be seen or accessed when two interlocking members are combined. Such a feature was indicated as an option with respect to the interlocking member 10 of FIGS. 1A through 1D, as an example. Closed wall 85 yields recesses 18 that are completely internal to the clasp and not externally visible or otherwise accessible. In this manner, access to the hooks 16 and recesses 18 that maintain the two interlocking members of the clasp together is denied, thereby providing greater security and tamper-resistance for the clasp.

Figure 9:
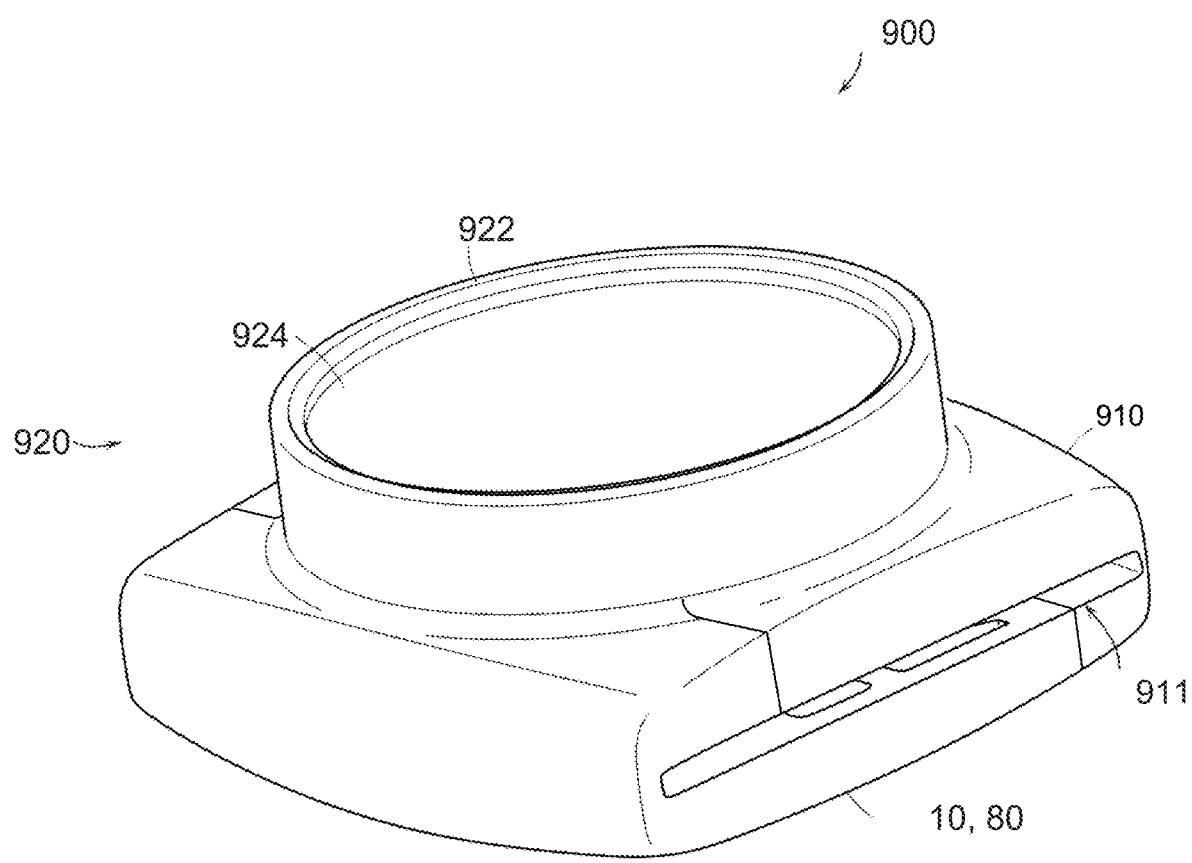
FIG. 9 shows an embodiment of a clasp including Bluetooth communications technology, according to aspects of the inventive concepts.
Figure 10A:
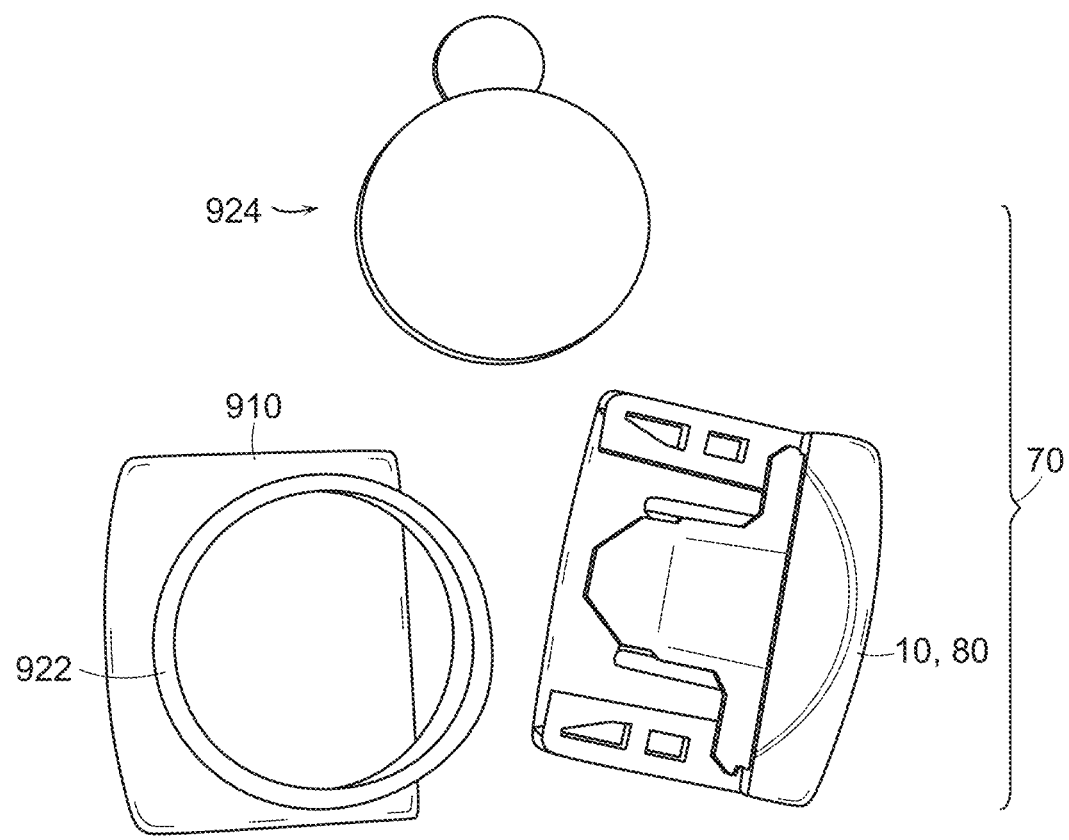
FIGS. 10A and 10B are figures showing an embodiment of components of the clasp of FIG. 9.
Figure 10B:
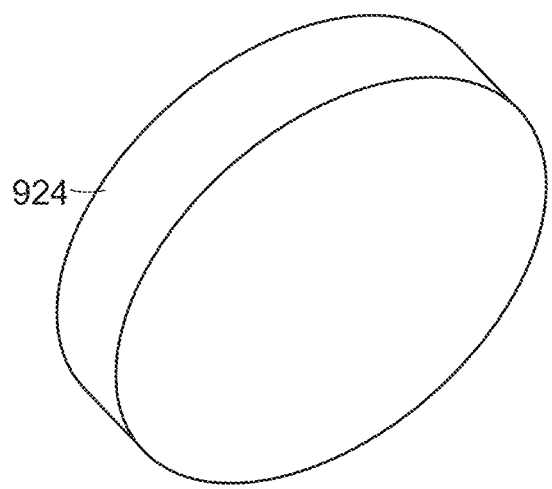

FIG. 9 shows an embodiment of a clasp 900 including Bluetooth communications capability. FIGS. 10A and 10B are figures showing an embodiment of components of the clasp of FIG. 9.

The clasp 900 includes first interlocking member 10, 80 (described above) and a second interlocking members 910. Interlocking member 910 can be substantially the same as interlocking members 10 and/or 80 discussed above with respect to various features and structures for securing together the interlocking members with a band secured therein that passes through a channel 911 formed within the clasp 900. Preferably, interlocking member 910 has at least one hook and at least one recess, where each recess is configured to receive a hook from another interlocking member and has a wall configured to prevent external access to the hook received within the recess, such as interlocking member 80.

In this embodiment, the clasp 900 includes a Bluetooth communication device 920. In various embodiments, the Bluetooth communication device 920 can be integral with, embedded within, or coupled to an outer shell 912 of the interlocking member 910. In various embodiments, the Bluetooth device 920 can be adhered to the outer shell 912 of the interlocking member 910. In various embodiments, the Bluetooth communication device 920 can be a sticker beacon 924 having a round shape and includes a 1 piece CR2016 coin battery. In various embodiments the beacon 924 can be maintained by a holder 922 secured to or integral with the outer shell 912.

In various embodiments, the Bluetooth communication device 910 can take the form of or include a Beacon, iBeacon, or miniBeacon, such as i9 Pilot MiniBeacon by Minew Technologies.

Figure 11:
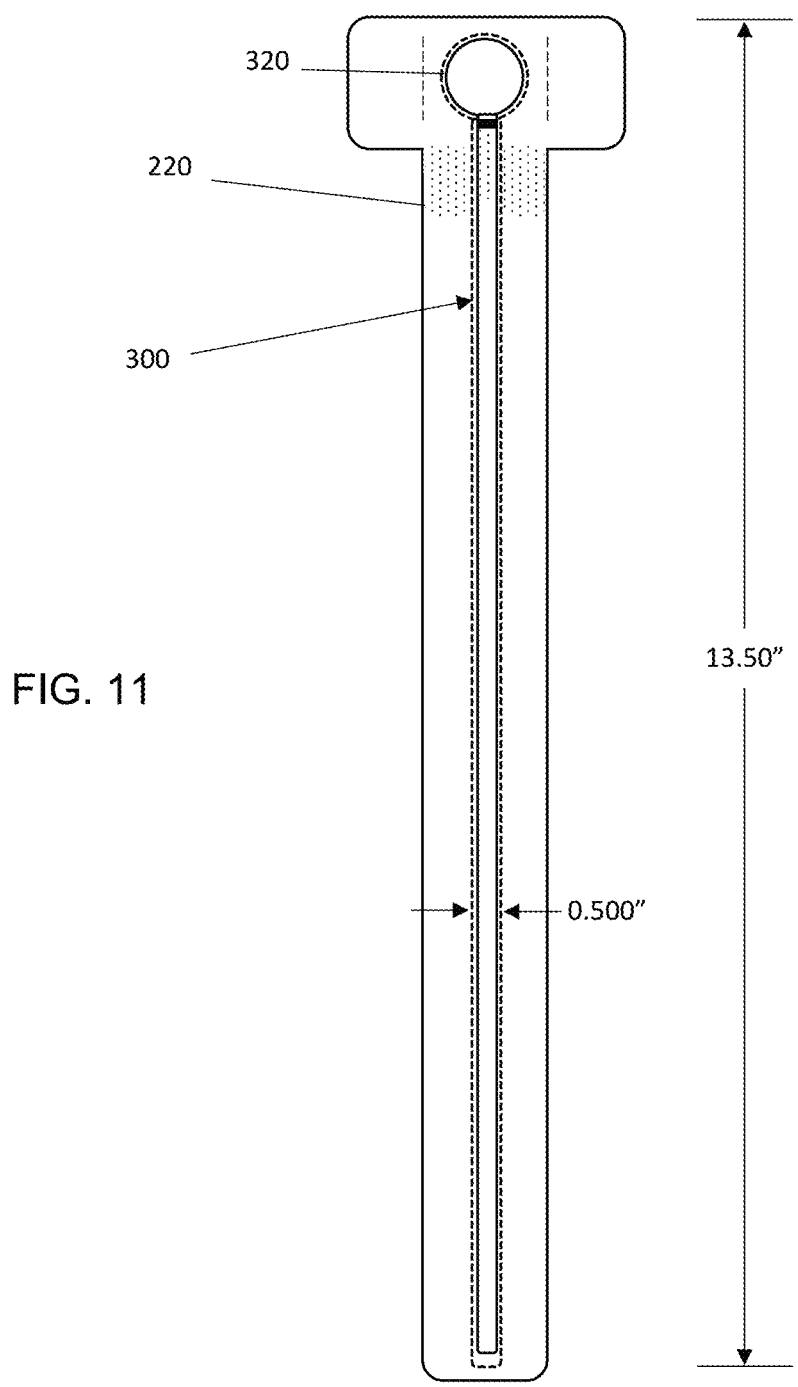
FIG. 11 shows an embodiment of a band including a Near Field Communication (NFC) wet inlay antenna, according to aspects of the inventive concepts.

FIG. 11 shows an embodiment of a flexible band including a cut-band (or cut) detection circuit. Referring to FIG. 11, in one embodiment, a flexible band 220 includes a cut-band detection circuit that determines when the flexible band 220 has a lack of continuity, e.g., caused by a cut, break, or other damage to the circuit. The cut detection circuit can send a wireless cut detection signal indicating such determination, referred to as a cut detection signal. For example, a signal degradation over the transmission medium can be processed by a processor of the cut detection circuit as the lack of continuity in the transmission medium. A secure band or secure identification band can include the flexible band and a secure clasp, such as those described herein. The flexible band can include a cut-band detection circuit comprising a memory, a micro-processor, a transmission medium, and a wireless communication device. The flexible band can have at least two states, an intact state and a cut state. The cut state can be indicated as an open circuit or as a short circuit determined by a break (or cut), damage, or occlusion of the transmission medium of the circuit. The transmission medium can be any medium configured to carry a signal e.g., copper or other wires, traces, or strips, or other conductive materials, or optical fiber. In various embodiments, the transmission medium at least 90 percent of the length of the flexible band.

The memory can include computer logic or code that is executable by the processor to generate the cut detection signal in response to the cut, damage, and or occlusion of the transmission medium.

In some embodiments, the cut detection signal can include information useful for identifying an individual wearing or otherwise associated with the secure ID band. In some embodiments, the cut detection signal can identify the secure ID band or clasp, e.g., by number or code, which can be associated with a wearer of the band by an external processor and/or system. In some embodiments, therefore, the wireless cut detection signal can include data and/or information directly or indirectly identifying the individual wearing the secure ID band, or wearer. The identification of the wearer can be stored in a memory local to the cut-band detection circuit, remote to the cut-band detection circuit, or some combination of the two. For example, the wireless cut detection signal can include or embody a number or code associated with the secure ID band (or its clasp), which can then be processed to identify the individual wearing the secure ID band. As another example, the wireless cut detection signal can include or embody a number, code, or name of or associated with the individual wearing the secure ID band.

In various embodiments, the wireless cut detection signal can include or embody data or information indicating a category, status, or other characteristic of the individual wearing the ID band. Such category, status, or other characteristic could be used to indicate a group to which the individual belongs, a location associated with the individual (e.g., a home prison block for a prisoner, a hospital ward associated with a patient, a parolee, a street address, a GPS location, etc.), or a level of health or dangerousness of the individual wearing the secure ID band (e.g., a mental illness associated with a patient, a registered sex-offender, a suspect or criminal subject to home confinement, a person having a contagious disease, etc.).

In some embodiments, the cut detection circuit can include a passive RFID inlay attached to the flexible band or forming part of the flexible band. The passive RFID inlay can take the form of or include a Near Field Communication (NFC) inlay antenna 300. In various embodiments, NFC inlay antenna 300 can take the form of or include a Circus™ Tamper Loop.

The band NFC inlay antenna 300 may be adhered to or integral with the flexible band 220 and extend a full or partial length of the band 220. In various embodiments, the inlay antenna extends at least 90 percent of the length of the flexible band. In some embodiments, the inlay antenna can be a wet inlay antenna, e.g., having an adhesive and release liner. In other embodiments, the antenna can be a dry inlay antenna, e.g., without adhesive and release layer.

When the flexible band 220 is cut, broken, or otherwise compromised and the NFC inlay antenna 300 is also cut, broken, or otherwise compromised, the cut detection circuit determines that the band has the cut state. The determination can be due to a lack of continuity in the inlay antenna, which can the indicated by signal degradation over the inlay antenna (transmission medium) caused by a cut, break or other damage to the inlay antenna. The IC 320 in cooperation with the NFC antenna 300 is configured to detect the cut state and generate the cut detection signal, such as an RFID signal. In some embodiments, the IC 320 can have one-time password for protection against cloning.

Figure 12:
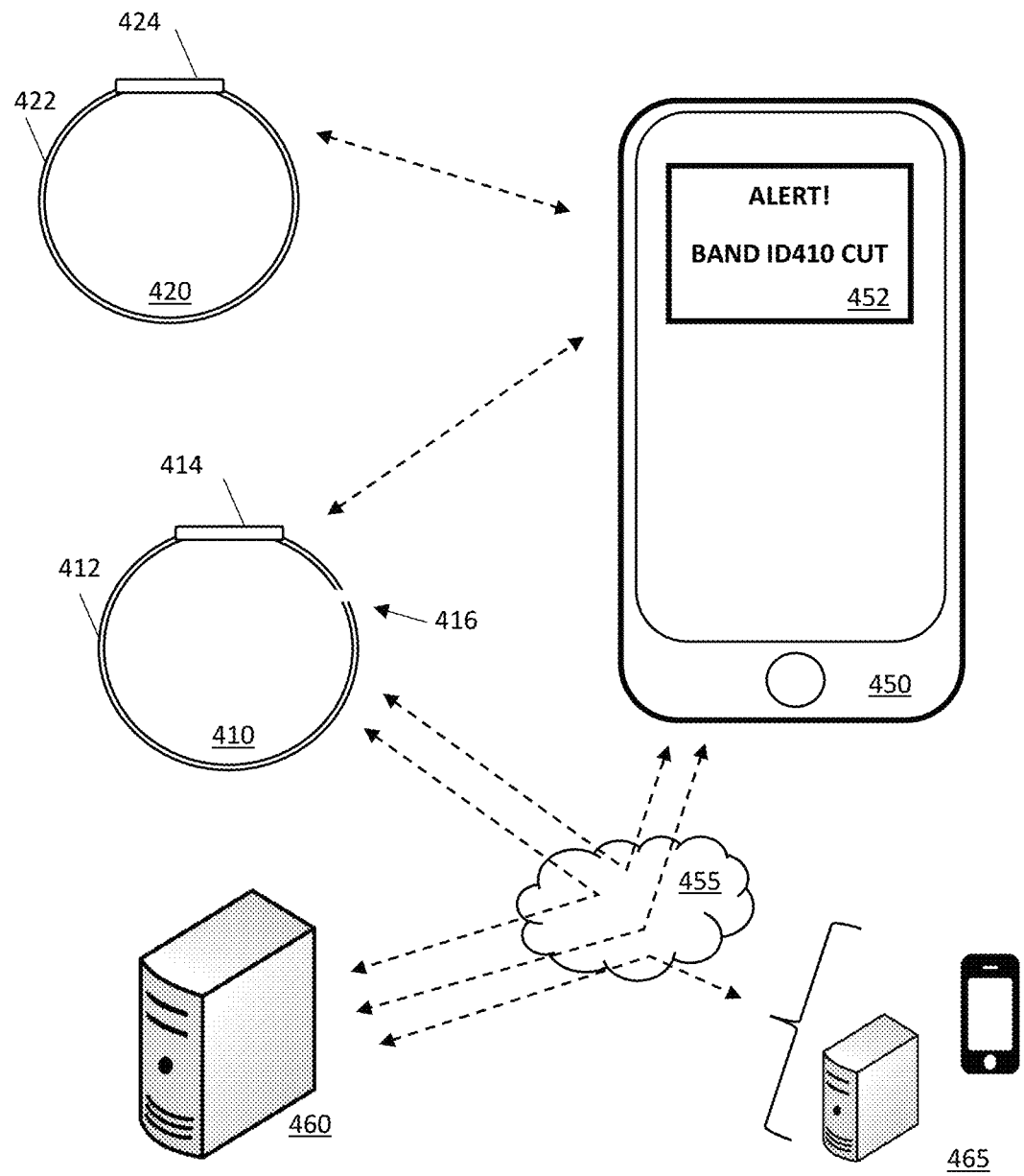
FIG. 12 shows an embodiment of a cut detection system, according to aspects of the inventive concepts.

In some embodiments, the cut detection circuit is configured to communicate with an external or remote device or system when the cut state is detected (see FIG. 12). Such external devices can be a mobile device (or mobile phone or tablet) that is configured for wireless communication, such as being Bluetooth enabled. In such cases, the mobile device can include a mobile device application (or cut detection "app") executable by a processor of a mobile device to wirelessly communicate with one or more flexible bands to receive the cut detection signal and responsively generate a cut detection indication, which can include an alert.

In some embodiments, the flexible band 220 may be used in connection with a clasp including an RFID device, such as the clasps discussed above. The clasp 900 may be snapped onto the band 220 having the NFC inlay antenna 300 adhered to length of the band to act as cut band detector. The portion of the NFC inlay containing an IC 320 can be placed under or within the clasp to protect the IC.

When the band 220 is cut, broken, or otherwise compromised, the antenna 300 gets physically broken and the break is detected by the IC 320. That is, the state of the NFC inlay antenna 300 can indicate whether or not the band has been broken, cut or otherwise compromised. In response, the IC 320 can generate the cut detection signal for transmission by the RFID device of the cut detection circuit. In some embodiments, the cut detection status of the cut detection circuit can be checked using a mobile device via software, a programmed on-chip URL, or via other forms of applications.

In some embodiments, RF and/or Bluetooth devices in the clasp can provide additional communication technology as an alternative to or to augment the communications of the RFID cut detection circuit. For example, the band having cut detection technology can be used with clasp 900 of FIG. 9 including the Bluetooth communication device 910.

Such communication technology can be used, for example, to locate the secure ID band and/or enable communications between the band and external devices. However, in various embodiments, the secure ID band need not include a clasp with RF or Bluetooth communication devices. As an RFID device, the cut detection circuit is capable of transmitting the cut detection signal without the RF or Bluetooth communication devices of the clasp.

In some embodiments, the NFC inlay antenna 300 and the Bluetooth communication device 910 can communicate with one or more mobile devices or other systems having companion software and applications, e.g., a cut detection application. See, for example, FIG. 12. The cut detection application can be configured to enable individuals wearing the secure ID band to be automatically monitored to ensure that the band 220 has not been damaged, cut and/or removed. The NFC antenna 300 can communicates with the mobile device to indicate that it remains intact (uncut) or that it has been cut according to a schedule. In some embodiments, the mobile device can communicate with or query the secure ID band to confirm the band remains in the intact state, e.g., during planned intervals and/or whenever the monitoring mobile device comes within communication range of one more secure ID bands.

The application on the mobile device can process a cut detection signal to generate a cut detection indication, which can include or take the form of an alert at the mobile device, such as an audible and/or visual alert. In various embodiments, the indication can include an alert transmission to another mobile device. In various embodiments, the indication can include an alert transmission to an external system, such as a tracking, monitoring, and/or security system.

FIG. 12 shows an embodiment of a cut detection system. In FIG. 12, a mobile device 450 is shown having the cut detection application 452 thereon. The cut detection application 452 can be stored in memory on the mobile device and executed by the processor of the mobile device. Two bands are shown, as an example. Secure ID band 410 with cut detection includes the band substrate 412 (or flexible band) and a clasp 414. The flexible band can be substantially similar to the band 220 above comprising a cut detection circuit. The clasp 414 can be, for example, any clasp described herein. The clasp 414 can be irremovably locked onto the band, covering an overlapping portion of the band and, preferably, the micro-processor of the cut detection circuit. The cut detection circuit can be configured to wirelessly communicate with the cut detection app 452 on the mobile device 450.

Secure ID band 420 with cut detection is substantially similar to secure ID band 410. That is, secure ID band 420 includes the flexible substrate 422 and clasp 424, which are substantially similar to flexible substrate 412 and clasp 414 of secure ID band 410. Like secure ID band 410, secure ID band 420 can wirelessly communicate with the cut detection app 452 on mobile device 450.

In FIG. 12, flexible band 412 has a cut 416. Therefore, the secure ID band 410 generates a cut detection signal, which is wirelessly communicated to cut detection app 452 of the mobile device 450, e.g., an NFC-enabled smartphone. The cut detection app 452 generates a cut detection alert, in this example, that identifies the cut band by an identification. The cut detection signal can be transmitted to the cut detection app 452 directly to the mobile device via any one or more forms of wireless communication, e.g., RFID, Bluetooth, and so on, or via one or more networks, e.g., local area network, wide area network, cellular network, Internet, World Wide Web, and so on.

Since the secure band 420 does not have a cut, it can generate a signal to cut detection app 452 that the band 422 is intact, or it can only generate a signal when the band 422 has a cut state. Those skilled in the art will appreciate that the cut detection app 452 could execute on a wide variety of types of devices, and is not limited to mobile phones or other mobile devices.

In some embodiments, the secure ID band 410, 420, having a cut detection circuit, can communicate with a remote monitoring system 460, via any of a variety of networks 455. In some embodiments, the secure ID band can communicate the cut detection signal to a mobile device 450, and the mobile device 450 can communicate the cut detection signal, or other information, to a remote monitoring system 460. The remote monitoring system 460 can be configured to communicate alerts based on the cut detection signal and/or forward the cut detection signal to other systems or devices 465. As examples, the remote monitoring system 460 can be a monitoring system of a prison or hospital or other venue.

In various embodiments, the IC in the cut detection circuit of the secure ID bands 410, 420 can include one-time password (OTP) setting logic, for cloning protection. The OTP can be accomplished using the smartphone to enable the NFC cut detection circuit. The cut detection app 452 can include the OTP logic, or it could be provided by a separate resource, e.g., via the mobile device 450.

Figure 13:
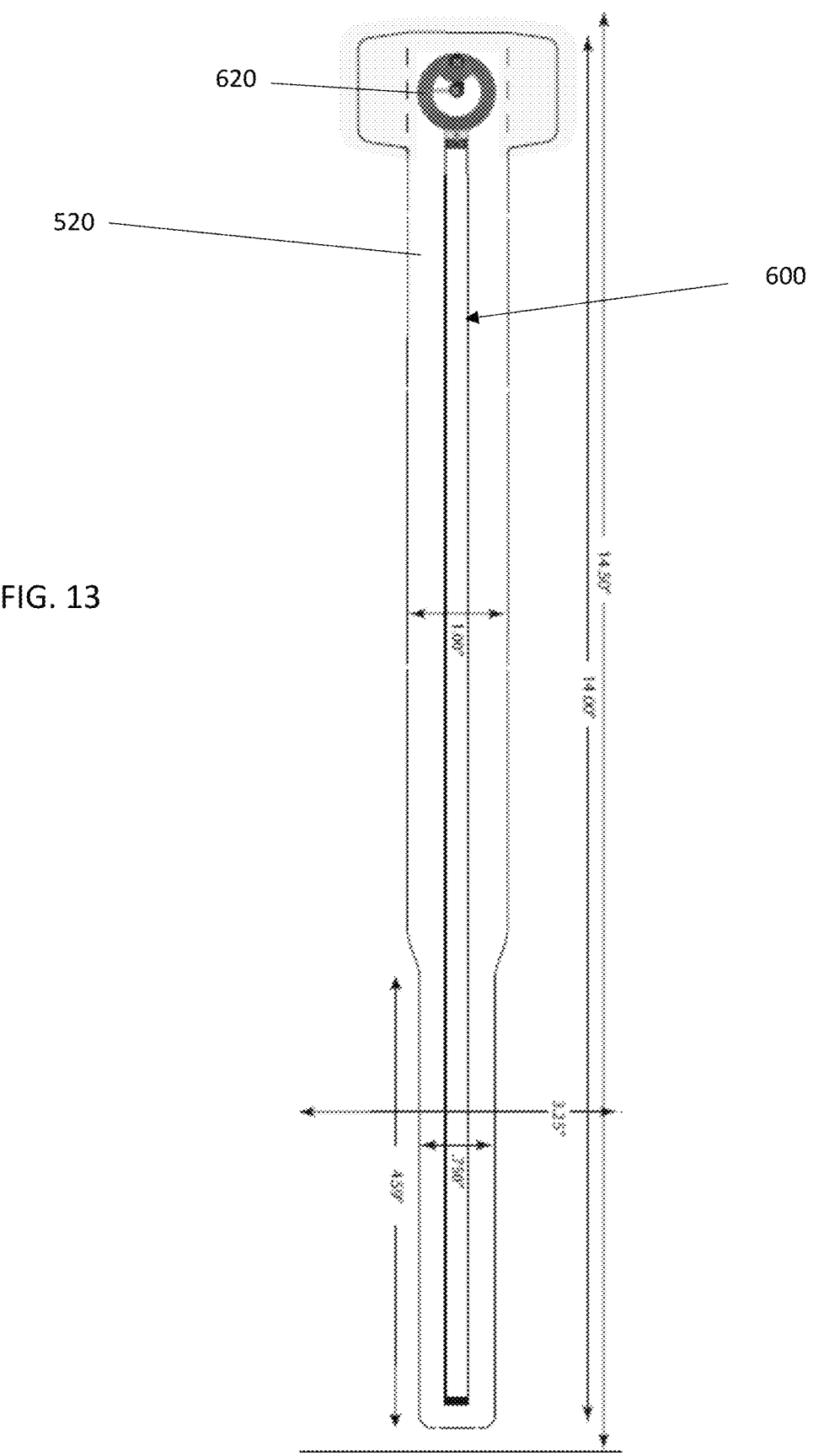
FIG. 13 shows another embodiment of band including a cut detection system, according to aspects of the inventive concepts.

FIG. 13 shows a cut detection system, according to an example embodiment of the present inventive concept. A flexible band 520 can be substantially similar to the band 220 above comprising a cut detection circuit. The flexible band 520 of FIG. 13 includes a transmission medium which is a conductive trace 600 that extends a length of the band to act as cut band detector. The portion of the conductive trace containing an IC 620 can be placed under or within the clasp to protect the IC. The IC 620 is substantially similar to IC 320.

Figure 14:
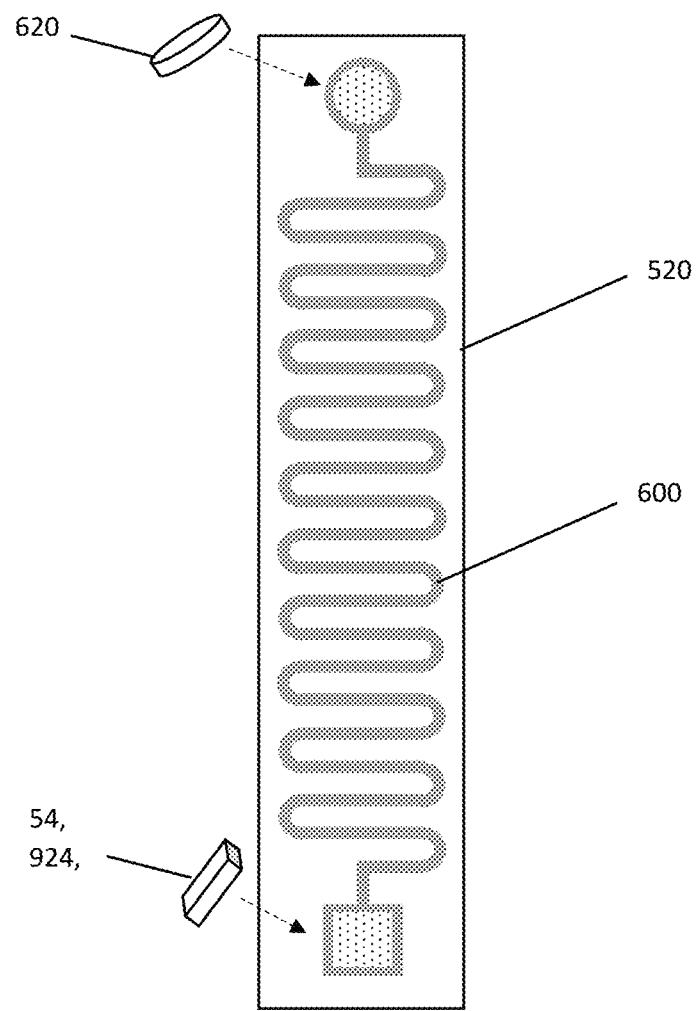
FIG. 14 is an exploded view of an embodiment of portions of a cut detection system, according to aspects of the inventive concepts.

FIG. 14 is an exploded view of conductive trace 600 and related components. In this embodiment, the length of the flexible band 520 is longer than band 220 and covers a substantial width, e.g., greater than 50%, of the band.

The conductive trace 600 according to the embodiment of FIG. 13 comprises a conductive trace formed of a polymer and rubberized ink with micro particles of a conductor. The conductive trace 600 is less brittle and more durable which results in a more durable band when worn and subject to abuse in the field. The conductive trace 600 may be a stretchable conductive trace extending the length of the flexible band that can be used to carry the electrical signals. Rubberized or conductive ink may be screen printed onto an elastomeric substrate, which is in turn bonded to the underlying band by pressing with heat. An encapsulant material protects the conductive trace. Conductive adhesives bond the sensors, transmitters, and other components to the conductive trace, completing the system and allowing the sensors and transmitters to communicate. When the band 520 is cut or broken, the conductive trace 600 gets physically broken or damaged and the break (or damage) is detected by the IC 620.

The conductive trace 600 can take the form of or include a conductive trace similar to those provided by ACI Materials.

Figure 15:
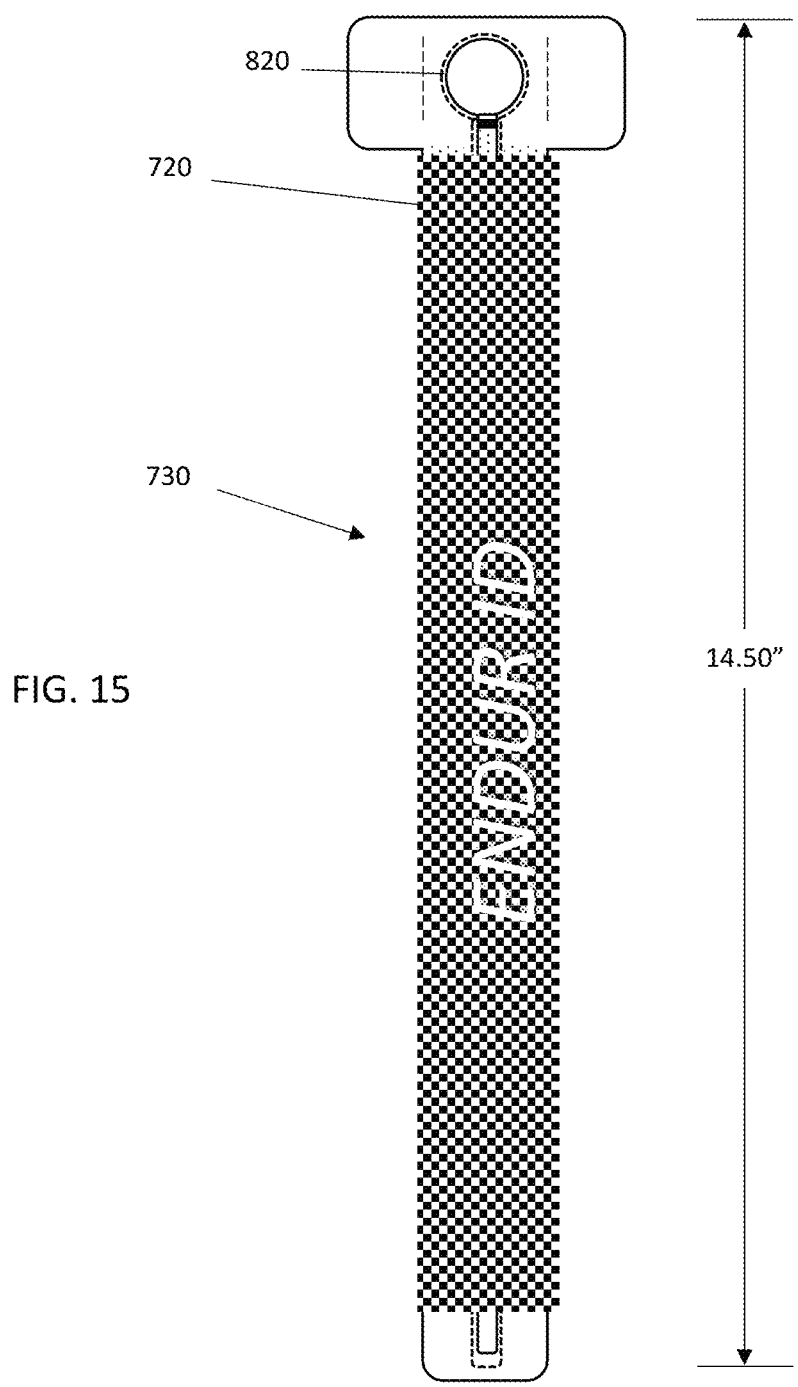
FIG. 15 shows another embodiment of a cut detection system, according to aspects of the inventive concepts.

FIG. 15 shows a cut detection system, according to an alternative embodiment of the present inventive concept. In this embodiment, a flexible band 720 can be substantially similar to the band 520 above comprising a cut detection circuit. The band 720 includes a conductive trace substantially similar to conductive trace 600 and an IC 820 substantially similar to IC 620. The flexible band 720 can include artwork 730 printed thereon.

The flexible bands 520 and 720 may be used as the flexible bands in the secure ID bands 410 and 420 of FIG. 12, and could be used with any of the clasps disclosed herein, as examples.

While the foregoing has described what are considered to be the best mode and/or other preferred embodiments, it is understood that various modifications can be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

It is appreciated that certain features of the invention, which are, for clarity, described in the context of separate embodiments, may also be provide in combination in a single embodiment. Conversely, various features of the invention which are, for brevity, described in the context of a single embodiment may also be provided separately or in any suitable sub-combination.

For example, it will be appreciated that all of the features set out in any of the claims (whether independent or dependent) can combined in any given way.

What is claimed is:

1. A cut-detection identification band, comprising:
    a printable multilayer flexible laminated polyethylene film band having an end with an adhesive portion configured to overlap and permanently adhere to another portion of the band to form a loop around a wrist or ankle that is irremovable without tampering;
    a transmission medium extending at least 90% of a length of the band;
    a processor coupled to the transmission medium;
    a wireless communication device coupled to the processor; and
    a memory comprising detection logic executable by the processor to transmit a cut detection signal via the wireless communication device in response to a lack of continuity in the transmission medium,
    wherein the transmission medium, wireless communication device, processor and memory form part of an inlay antenna disposed between layers of the band.

2. The apparatus of claim 1, further comprising:
    a clasp configured to irremovably secure overlapping portions of the flexible band and the processor so that the clasp cannot be slid sideways relative to the band.

3. The apparatus of claim 2, wherein the clasp comprises a Bluetooth communication device secured to or integral with the clasp.

4. The apparatus of claim 2, wherein the clasp comprises a RF communication device secured to or integral with the clasp.

5. The apparatus of claim 1, wherein the transmission medium is a conductive medium or a fiber optic medium.

6. The apparatus of claim 1, wherein the processor, the inlay antenna, and the wireless communication device comprise a RFID (Radio Frequency Identification) device.

7. The apparatus of claim 1, wherein the inlay antenna is a Near Field Communication (NFC) inlay antenna.

8. The apparatus of claim 1, wherein the inlay antenna is a wet inlay antenna.

9. The apparatus of claim 1, wherein the inlay antenna is a dry inlay antenna.

10. The apparatus of claim 1, wherein the memory further comprises identification information identifying a wearer of the identification band and/or of the identification band.

11. The apparatus of claim 1, wherein a cut or break in the transmission medium is processed by the processor as the lack of continuity in the transmission medium.

12. The apparatus of claim 1, wherein signal degradation over the transmission medium is processed by the processor as the lack of continuity in the transmission medium.

13. The apparatus of claim 1, wherein the cut detection circuit comprises one-time protection (OTP) logic configured to authenticate and enable the cut detection circuit.

14. The apparatus of claim 1, further comprising:
a cut detection application executable by a processor of a remote device to:
  wirelessly communicate with one or more secure identification bands, and
  in response to a received cut detection signal from a secure identification band, generate a cut detection indication.

15. The apparatus of claim 14, wherein the cut detection indication includes an alert at the remote device.

16. The apparatus of claim 14, wherein the cut detection indication includes a transmission to an external monitoring system.

17. A cut-detection identification band, comprising:
a printable multilayer flexible laminated polyethylene film band having an end with an adhesive portion configured to overlap and permanently adhere to another portion of the band to form a loop around a wrist or ankle that is irremovable without tampering;
an RFID inlay antenna extending at least 90% of a length of the band; and
a cut detection circuit configured to generate a cut detection signal via the wireless communication device in response to a lack of continuity in the inlay antenna, wherein the RFID inlay antenna and the cut detection circuit are disposed between layers of the band.

18. The apparatus of claim 1, further comprising:
a clasp configured to irremovably secure overlapping portions of the flexible band and the processor so that the clasp cannot be slid sideways relative to the band.

19. The apparatus of claim 18, wherein the clasp comprises a Bluetooth communication device secured to or integral with the clasp.

20. The apparatus of claim 17, wherein the cut detection circuit comprises one-time protection (OTP) logic configured to authenticate and enable the cut detection circuit.

* * * * *

UNITED STATES PATENT AND TRADEMARK OFFICE
CERTIFICATE OF CORRECTION

PATENT NO. : 11,308,748 B2
APPLICATION NO. : 16/867673
DATED : April 19, 2022
INVENTOR(S) : Larose et al.

It is certified that error appears in the above-identified patent and that said Letters Patent is hereby corrected as shown below:

In the Claims

Column 24, Line 22, Claim 18, change The apparatus of claim 1, to read The apparatus of claim 17.

Signed and Sealed this
Thirtieth Day of August, 2022

Katherine Kelly Vidal
*Director of the United States Patent and Trademark Office*